US011847657B2

(12) United States Patent
Callender

(10) Patent No.: US 11,847,657 B2
(45) Date of Patent: *Dec. 19, 2023

(54) BATCH-PROCESSING TRANSACTIONS IN RESPONSE TO AN EVENT

(71) Applicant: Block, Inc., San Francisco, CA (US)

(72) Inventor: Kyle Callender, San Francisco, CA (US)

(73) Assignee: Block, Inc., Oakland, CA (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/138,382

(22) Filed: Dec. 30, 2020

(65) Prior Publication Data

US 2021/0209598 A1   Jul. 8, 2021

Related U.S. Application Data

(63) Continuation of application No. 16/219,060, filed on Dec. 13, 2018, now Pat. No. 10,915,905.

(51) Int. Cl.
| | |
|---|---|
| G06Q 20/40 | (2012.01) |
| G06Q 20/10 | (2012.01) |
| G06Q 40/00 | (2023.01) |
| G06Q 20/20 | (2012.01) |
| H04W 4/021 | (2018.01) |

(Continued)

(52) U.S. Cl.
CPC ....... *G06Q 20/405* (2013.01); *G06F 16/1865* (2019.01); *G06Q 20/20* (2013.01); *G06Q 20/401* (2013.01); *G06Q 30/0633* (2013.01); *H04W 4/021* (2013.01)

(58) Field of Classification Search
CPC .... G06Q 20/405; G06Q 20/20; G06Q 20/401; G06Q 30/0633; G06F 16/1865; H04W 4/021
USPC ......................................................... 705/44
See application file for complete search history.

(56) References Cited

U.S. PATENT DOCUMENTS

| | | |
|---|---|---|
| 4,485,300 A | 11/1984 | Peirce |
| 5,980,089 A | 11/1999 | Weis |
| 6,373,950 B1 | 4/2002 | Rowney |

(Continued)

OTHER PUBLICATIONS

Notice of Allowance dated Jun. 4, 2021 for U.S. Appl. No. 16/198,336, of Matoba, M., filed Nov. 21, 2018.

(Continued)

*Primary Examiner* — Hai Tran
(74) *Attorney, Agent, or Firm* — Lee & Hayes, P.C.

(57) ABSTRACT

Batch-processing of open tabs associated with one or more customers of a merchant is described. An identifier and/or payment instrument associated with the customer may be determined and a tab data structure associated with a customer may be created. The tab data structure may be configured to store interactions between the customer and the merchant. Details of transactions between the customer and the merchant may be stored while the tab remains open. In response to determining that an event has occurred, the open tab(s) may be closed and the stored transactions may be processed via a batch-processing technique. In this way, the open tabs associated with the customer and/or the merchant may be processed in batch, thereby reducing the level of interaction and resources required of the merchant and customer to process tabs individually and reducing the amount of delayed and/or lost funds.

20 Claims, 7 Drawing Sheets

(51) Int. Cl.
  *G06Q 30/0601* (2023.01)
  *G06F 16/18* (2019.01)

(56) References Cited

U.S. PATENT DOCUMENTS

| | | | |
|---|---|---|---|
| 6,473,740 B2 | 10/2002 | Cockrill et al. |
| 6,727,925 B1 | 4/2004 | Bourdelais |
| 6,732,934 B2 | 5/2004 | Hamilton et al. |
| 6,920,431 B2 | 7/2005 | Showghi et al. |
| 7,071,842 B1 | 7/2006 | Brady, Jr. |
| 7,293,254 B2 | 11/2007 | Bloesch et al. |
| 7,370,794 B2 | 5/2008 | Trane |
| 7,536,307 B2 | 5/2009 | Barnes et al. |
| 7,571,468 B1 | 8/2009 | Williams |
| 7,685,052 B2 | 3/2010 | Waelbroeck et al. |
| 7,748,621 B2 | 7/2010 | Gusler et al. |
| 7,756,745 B2 | 7/2010 | Leet et al. |
| 7,797,204 B2 | 9/2010 | Balent |
| 7,805,382 B2 | 9/2010 | Rosen et al. |
| 7,942,337 B2 | 5/2011 | Jain |
| 7,958,029 B1 | 6/2011 | Bobich et al. |
| 8,069,085 B2 | 11/2011 | Ahlers et al. |
| 8,123,370 B2 | 2/2012 | Maekawa |
| 3,190,483 A1 | 5/2012 | Woycik et al. |
| 8,260,723 B2 | 9/2012 | Carrott |
| 8,370,207 B2 | 2/2013 | Edwards |
| 8,380,177 B2 | 2/2013 | Laracey |
| 8,534,551 B2 | 9/2013 | Rothschild |
| 8,671,002 B2 | 3/2014 | Stefik et al. |
| 8,676,708 B1 | 3/2014 | Honey |
| 8,688,574 B2 | 4/2014 | Stringfellow et al. |
| 8,694,456 B2 | 4/2014 | Grigg et al. |
| 8,700,659 B2 | 4/2014 | Skeen et al. |
| 8,732,193 B2 | 5/2014 | Skeen et al. |
| 8,738,451 B2 | 5/2014 | Ahlers et al. |
| 8,762,207 B2 | 6/2014 | Kobres |
| 8,799,111 B2 | 8/2014 | Prellwitz et al. |
| 8,831,677 B2 | 9/2014 | Villa-Real |
| 8,856,170 B2 | 10/2014 | Skeen et al. |
| 8,862,504 B2 | 10/2014 | Sobek |
| 8,875,990 B2 | 11/2014 | Bishop et al. |
| 8,885,894 B2 | 11/2014 | Rowen et al. |
| 8,977,567 B2 | 3/2015 | Aabye et al. |
| 9,002,584 B2 | 4/2015 | Van Wiemeersch et al. |
| 9,037,491 B1 | 5/2015 | Lee |
| 9,064,359 B2 | 6/2015 | Lert, Jr. et al. |
| 9,165,298 B2 | 10/2015 | Hayhow |
| 9,195,982 B2 | 11/2015 | Orr et al. |
| 9,218,413 B2 | 12/2015 | Skeen et al. |
| 9,311,639 B2 | 4/2016 | Filler |
| 9,342,823 B2 | 5/2016 | Casares et al. |
| 9,349,108 B2 | 5/2016 | Skeen et al. |
| 9,355,470 B2 | 5/2016 | Merrell et al. |
| 9,390,424 B2 | 7/2016 | Hendrickson |
| 9,409,978 B2 | 8/2016 | Doxsey et al. |
| 9,426,183 B2 | 8/2016 | Shahidzadeh et al. |
| 9,430,784 B1 | 8/2016 | Frederick et al. |
| 9,444,932 B2 | 9/2016 | Ravenel et al. |
| 9,477,995 B2 | 10/2016 | Nathanel et al. |
| 9,514,427 B2 | 12/2016 | Taylor et al. |
| 9,515,999 B2 | 12/2016 | Ylonen |
| 9,536,243 B2 | 1/2017 | Khan |
| 9,563,890 B2 | 2/2017 | Zhou |
| 9,569,757 B1 | 2/2017 | Wilson et al. |
| 9,569,768 B2 | 2/2017 | Kean |
| 9,576,285 B2 | 2/2017 | Zhou |
| 9,576,289 B2 | 2/2017 | Henderson et al. |
| 9,582,598 B2 | 2/2017 | Kalgi |
| 9,582,797 B1 | 2/2017 | Holmes et al. |
| 9,633,344 B2 | 4/2017 | Nathanel et al. |
| 9,666,023 B2 | 5/2017 | Irwin, Jr. |
| 9,734,463 B2 | 8/2017 | Skeen et al. |
| 9,785,930 B1 | 10/2017 | Terra et al. |
| 9,799,028 B2 | 10/2017 | Dickelman |
| 9,799,380 B2 | 10/2017 | Iabraaten |
| 9,811,838 B1 | 11/2017 | Daire et al. |
| 9,817,646 B1 | 11/2017 | Chen et al. |
| 9,824,233 B2 | 11/2017 | Kaplan et al. |
| 9,824,408 B2 | 11/2017 | Isaacson et al. |
| 9,875,469 B1 | 1/2018 | Chin et al. |
| RE46,731 E | 2/2018 | Woycik et al. |
| 9,922,324 B2 | 3/2018 | Wilson et al. |
| 9,934,784 B2 | 4/2018 | May et al. |
| 9,940,374 B2 | 4/2018 | Orumchian et al. |
| 9,959,529 B1 | 5/2018 | Varma et al. |
| 9,965,755 B2 | 5/2018 | Richelson et al. |
| 9,972,003 B2 | 5/2018 | Mooring, II et al. |
| 10,002,397 B2 | 6/2018 | Rose |
| 10,007,953 B1 | 6/2018 | Nathoo et al. |
| 10,019,011 B1 | 7/2018 | Green et al. |
| 10,019,149 B2 | 7/2018 | Chirakan et al. |
| 10,019,698 B1 | 7/2018 | Scott et al. |
| 10,026,062 B1 | 7/2018 | Sasmaz et al. |
| 10,031,420 B2 | 7/2018 | Ongayi et al. |
| 10,032,171 B2 | 7/2018 | Yeager |
| 10,043,149 B1 | 8/2018 | Iacono et al. |
| 10,043,162 B1 | 8/2018 | Renke et al. |
| 10,043,209 B2 | 8/2018 | Cooke et al. |
| 10,055,722 B1 | 8/2018 | Chen et al. |
| 10,068,225 B2 | 9/2018 | Barrett |
| 10,068,272 B1 | 9/2018 | Varma et al. |
| 10,074,148 B2 | 9/2018 | Cashman et al. |
| 10,078,820 B2 | 9/2018 | Renke et al. |
| 10,089,701 B2 | 10/2018 | Harman |
| 10,091,617 B2 | 10/2018 | Chicoine et al. |
| 10,108,951 B2 | 10/2018 | Argue et al. |
| 10,147,130 B2 | 12/2018 | Scholl et al. |
| 10,204,328 B2 | 2/2019 | Argue et al. |
| 10,210,569 B1 | 2/2019 | Kim et al. |
| 10,255,645 B1 | 4/2019 | Christensen et al. |
| 10,275,752 B2 | 4/2019 | Wilson et al. |
| 10,289,991 B1 | 5/2019 | Muller et al. |
| 10,289,992 B1 | 5/2019 | Bell et al. |
| 10,311,420 B1 | 6/2019 | Bell et al. |
| 10,313,383 B2 | 6/2019 | Sommer |
| 10,319,013 B2 | 6/2019 | Moring et al. |
| 10,319,042 B2 | 6/2019 | Arvapally et al. |
| 10,346,605 B2 | 7/2019 | Narasimhan |
| 10,360,648 B1 | 7/2019 | Rocklin et al. |
| 10,467,559 B1 | 11/2019 | Svenson et al. |
| 10,528,945 B1 | 1/2020 | Renke et al. |
| 10,580,062 B1 | 3/2020 | Abrons et al. |
| 10,607,435 B2 | 3/2020 | Lutnick et al. |
| 10,628,815 B1 | 4/2020 | Woo et al. |
| 10,679,278 B2 | 6/2020 | Harman |
| 10,740,715 B1 | 8/2020 | Kumar et al. |
| 10,755,349 B1 | 8/2020 | Boates et al. |
| 10,769,710 B2 | 9/2020 | Yang |
| 10,915,905 B1 | 2/2021 | Callender |
| 11,138,680 B1 | 10/2021 | Matoba |
| 11,151,530 B2 | 10/2021 | Bell et al. |
| 11,182,762 B1 | 11/2021 | Bell et al. |
| 2003/0174823 A1 | 9/2003 | Justice et al. |
| 2004/0243468 A1 | 12/2004 | Cohagan et al. |
| 2005/0004843 A1 | 1/2005 | Heflin |
| 2006/0143087 A1 | 6/2006 | Tripp et al. |
| 2006/0178986 A1 | 8/2006 | Giordano et al. |
| 2007/0018041 A1 | 1/2007 | Butler et al. |
| 2007/0235533 A1 | 10/2007 | Giordano |
| 2008/0015987 A1 | 1/2008 | Ramavarjula et al. |
| 2009/0063312 A1 | 3/2009 | Hurst |
| 2009/0083069 A1 | 3/2009 | Tierney et al. |
| 2009/0090783 A1 | 4/2009 | Killian et al. |
| 2009/0192913 A1 | 7/2009 | Saito et al. |
| 2009/0228336 A1 | 9/2009 | Giordano et al. |
| 2009/0240624 A1 | 9/2009 | James et al. |
| 2010/0010906 A1 | 1/2010 | Grecia |
| 2010/0088207 A1 | 4/2010 | McLaughlin et al. |
| 2011/0022472 A1 | 1/2011 | Zon |
| 2011/0087592 A1 | 4/2011 | van der Veen et al. |
| 2011/0215159 A1 | 9/2011 | Jain |
| 2011/0251909 A1 | 10/2011 | Clark |
| 2011/0288967 A1 | 11/2011 | Selfridge |
| 2011/0320345 A1 | 12/2011 | Taveau et al. |

(56) References Cited

U.S. PATENT DOCUMENTS

| | | | |
|---|---|---|---|
| 2012/0130787 A1 | 5/2012 | Stouffer et al. | |
| 2012/0130899 A1 | 5/2012 | McMonagle et al. | |
| 2012/0136754 A1 | 5/2012 | Underwood | |
| 2012/0173350 A1 | 7/2012 | Robson | |
| 2012/0209749 A1 | 8/2012 | Hammad et al. | |
| 2012/0330837 A1 | 12/2012 | Persaud et al. | |
| 2013/0132274 A1 | 5/2013 | Henderson et al. | |
| 2013/0226805 A1 | 8/2013 | Griffin et al. | |
| 2013/0238455 A1 | 9/2013 | Laracey | |
| 2013/0290172 A1 | 10/2013 | Mashinsky | |
| 2014/0052586 A1 | 2/2014 | Weber | |
| 2014/0058902 A1 | 2/2014 | Taylor et al. | |
| 2014/0097241 A1 | 4/2014 | Tovar et al. | |
| 2014/0108237 A1* | 4/2014 | Carretta ................ | G06Q 20/10 705/39 |
| 2014/0222662 A1 | 8/2014 | Bierwas et al. | |
| 2014/0258011 A1 | 9/2014 | Shore | |
| 2014/0263622 A1 | 9/2014 | Babatz et al. | |
| 2014/0279534 A1 | 9/2014 | Miles | |
| 2014/0330654 A1 | 11/2014 | Turney et al. | |
| 2014/0351130 A1* | 11/2014 | Cheek .................... | G06Q 20/29 705/44 |
| 2014/0372300 A1 | 12/2014 | Blythe | |
| 2015/0032567 A1 | 1/2015 | Bhatia | |
| 2015/0095225 A1 | 4/2015 | Appana et al. | |
| 2015/0178712 A1 | 6/2015 | Angrish et al. | |
| 2015/0213565 A1 | 7/2015 | Garrett et al. | |
| 2015/0278789 A1 | 10/2015 | Richelson et al. | |
| 2015/0287006 A1 | 10/2015 | Hunter et al. | |
| 2015/0310408 A1 | 10/2015 | Anderson | |
| 2016/0247113 A1 | 8/2016 | Rademaker | |
| 2016/0267448 A1 | 9/2016 | James et al. | |
| 2016/0307151 A1 | 10/2016 | Grabovski et al. | |
| 2016/0307176 A1 | 10/2016 | Renke et al. | |
| 2016/0335613 A1 | 11/2016 | Laracey | |
| 2016/0353235 A1 | 12/2016 | Williams et al. | |
| 2017/0004475 A1 | 1/2017 | White et al. | |
| 2017/0018041 A1 | 1/2017 | Fox | |
| 2017/0061523 A1 | 3/2017 | Zambo et al. | |
| 2017/0083901 A1 | 3/2017 | Spencer, II | |
| 2017/0124671 A1 | 5/2017 | Tam et al. | |
| 2017/0161851 A1 | 6/2017 | Li et al. | |
| 2017/0193470 A1 | 7/2017 | Renke et al. | |
| 2017/0193543 A1 | 7/2017 | Priebatsch | |
| 2017/0279903 A1 | 9/2017 | Mimassi et al. | |
| 2018/0039965 A1 | 2/2018 | Han et al. | |
| 2018/0089658 A1 | 3/2018 | Bell et al. | |
| 2018/0150868 A1 | 5/2018 | Stone et al. | |
| 2018/0249861 A1 | 9/2018 | Hiatt et al. | |
| 2018/0271322 A1 | 9/2018 | Thai et al. | |
| 2018/0330346 A1 | 11/2018 | Grassadonia et al. | |
| 2018/0341933 A1 | 11/2018 | Renke et al. | |
| 2018/0365663 A1 | 12/2018 | Bell et al. | |
| 2019/0228463 A1 | 7/2019 | Chan et al. | |
| 2020/0273086 A1 | 8/2020 | Abrons et al. | |
| 2020/0364710 A1 | 11/2020 | Varma et al. | |
| 2022/0005131 A1 | 1/2022 | Matoba | |
| 2022/0224309 A1 | 7/2022 | Abrons et al. | |

OTHER PUBLICATIONS

Non-Final Office Action dated Sep. 11, 2020 for U.S. Appl. No. 16/198,336, of Matoba, M., filed Nov. 21, 2018.
Final Office Action dated Dec. 17, 2020 for U.S. Appl. No. 16/198,336, of Matoba, M., filed Nov. 21, 2018.
Mercury, "Bar Tabs and Credit Cards: The Mixology for POS Developers," Credit Card Acceptance Procedures When Supporting Bar Tabs, pp. 1-9 (May 29, 2014).
Non-Final Office Action dated Jun. 25, 2015, for U.S. Appl. No. 14/675,555, of Renke, C.P., et al., filed Mar. 31, 2015.
Final Office Action dated Dec. 31, 2015, for U.S. Appl. No. 14/675,555, of Renke, C.P., et al., filed Mar. 31, 2015.
Non Final Office Action dated Dec. 16, 2016, for U.S. Appl. No. 14/675,555, of Renke, C.P., et al., filed Mar. 31, 2015.
Non Final Office Action dated Jan. 18, 2017, for U.S. Appl. No. 14/675,565, of Renke, C.P., et al., filed Mar. 31, 2015.
Final Office Action dated Jul. 26, 2017, for U.S. Appl. No. 14/675,555, of Renke, C.P., et al., filed Mar. 31, 2015.
Advisory Action dated Nov. 8, 2017, for U.S. Appl. No. 14/675,555, of Renke, C.P., et al., filed Mar. 31, 2015.
Final Office Action dated Dec. 14, 2017, for U.S. Appl. No. 14/675,565, of Renke, C.P., et al., filed Mar. 31, 2015.
Non Final Office Action dated Feb. 27, 2018, for U.S. Appl. No. 14/675,555, of Renke, C.P., et al., filed Mar. 31, 2015.
Notice of Allowance dated Mar. 29, 2018, for U.S. Appl. No. 14/675,565, of Renke, C.P., et al., filed Mar. 31, 2015.
Non Final Office Action dated Jun. 19, 2018, for U.S. Appl. No. 15/905,643, of Wilson, M., et al., filed Feb. 26, 2018.
Non Final Office Action dated Aug. 14, 2018, for U.S. Appl. No. 15/185,354, of Bell, B., et al., filed Jun. 17, 2016.
Non Final Office Action dated Aug. 15, 2018, for U.S. Appl. No. 15/185,383, of Bell, B., et al., filed Jun. 17, 2016.
Final Office Action dated Sep. 4, 2018, for U.S. Appl. No. 14/675,555, of Renke, C.P., et al., filed Mar. 31, 2015.
Non Final Office Action dated Oct. 2, 2018, for U.S. Appl. No. 15/195,557, of Abrons, A., et al., filed Jun. 28, 2016.
Non Final Office Action dated Oct. 10, 2018, for U.S. Appl. No. 15/189, 131, of Rocklin, W., et al., filed Jun. 22, 2016.
Advisory Action dated Nov. 30, 2018, for U.S. Appl. No. 14/675,555, of Renke, C.P., et al., filed Mar. 31, 2015.
Notice of Allowance dated Dec. 11, 2018, for U.S. Appl. No. 15/905,643, of Wilson, M., et al., filed Feb. 26, 2018.
Notice of Allowance dated Dec. 28, 2018, for U.S. Appl. No. 15/185,383, of Bell, B., et al., filed Jun. 17, 2016.
Notice of Allowance dated Jan. 15, 2019, for U.S. Appl. No. 15/185,354, of Bell, B., et al., filed Jun. 17, 2016.
Advisory Action dated Jan. 24, 2019, for U.S. Appl. No. 14/675,555, of Renke, C.P., et al., filed Mar. 31, 2015.
Advisory Action dated Feb. 21, 2019, for U.S. Appl. No. 14/675,555, of Renke, C.P., et al., filed Mar. 31, 2015.
Notice of Allowance dated Mar. 6, 2019, for U.S. Appl. No. 15/189,131, of Rocklin, W., et al., filed Jun. 22, 2016.
Final Office Action dated Mar. 28, 2019, for U.S. Appl. No. 15/195,557, of Abrons, A., et al., filed Jun. 28, 2016.
Advisory Action dated May 29, 2019, for U.S. Appl. No. 15/195,557, of Abrons, A., et al., filed Jun. 28, 2016.
Notice of Allowance dated Jun. 24, 2019, for U.S. Appl. No. 15/721,522, of Svenson, T., et al., filed Sep. 29, 2017.
Non Final Office Action dated Jun. 28, 2019, for U.S. Appl. No. 15/195,557, of Abrons, A., et al., filed Jun. 28, 2016.
Notice of Allowance dated Aug. 14, 2019, for U.S. Appl. No. 14/675,555, of Renke, C.P., et al., filed Mar. 31, 2015.
Notice of Allowance dated Oct. 23, 2019, for U.S. Appl. No. 15/195,557, of Abrons, A., et al., filed Jun. 28, 2016.
Non Final Office Action dated Dec. 12, 2019, for U.S. Appl. No. 15/721,474, of Svenson, T., et al., filed Sep. 29, 2017.
Non Final Office Action dated Apr. 23, 2020, for U.S. Appl. No. 16/219,060, of Kyle, C., filed Dec. 13, 2018.
Non-Final Office Action dated Jun. 15, 2020, for U.S. Appl. No. 16/053,576, of Renke, C.P., et al., filed Aug. 2, 2018.
Final Office Action dated Jun. 25, 2020, for U.S. Appl. No. 15/721,474, of Svenson, T., et al., filed Sep. 29, 2017.
Notice of Allowance dated Oct. 5, 2020, for U.S. Appl. No. 16/219,060, of Kyle, C., filed Dec. 13, 2018.
Advisory Action dated Oct. 6, 2020, for U.S. Appl. No. 15/721,474, of Svenson, T., et al., filed Sep. 29, 2017.
Notice of Allowance dated Oct. 21, 2020, for U.S. Appl. No. 15/721,474, of Svenson, T., et al., filed Sep. 29, 2017.
Final Office Action dated Dec. 15, 2020, for U.S. Appl. No. 16/053,576, of Renke, C.P., et al., filed Aug. 2, 2018.
Non-Final Office Action dated Dec. 15, 2020, for U.S. Appl. No. 16/383,375, of Bruce, B., et al., filed Apr. 12, 2019.
Notice of Allowance dated Nov. 24, 2021, for U.S. Appl. No. 16/807,036, of Abrons, A., et al., filed Mar. 2, 2020.
Notice of Allowance dated Jul. 14, 2021, for U.S. Appl. No. 16/383,375, of Bruce, B., et al., filed Apr. 12, 2019.

(56) References Cited

OTHER PUBLICATIONS

Final Office Action dated Mar. 22, 2021, for U.S. Appl. No. 16/383,375, of Bruce, B, et al., filed Apr. 12, 2019.
Notice of Allowance dated Mar. 31, 2021, for U.S. Appl. No. 16/053,576, of Renke, C.P., et al., filed Aug. 2, 2018.
Corrected Notice of Allowability dated Feb. 9, 2022, for U.S. Appl. No. 16/807,036, of Abrons, A., et al., filed Mar. 2, 2020.
Notice of Allowance dated Dec. 7, 2021, for U.S. Appl. No. 16/807,036, of Abrons, A., et al., filed Mar. 2, 2020.
Notice of Allowance dated Aug. 26, 2021, for U.S. Appl. No. 16/383,375, of Bruce, B, et al., filed Apr. 12, 2019.

* cited by examiner

BATCH-PROCESSING TRANSACTIONS IN RESPONSE TO AN EVENT

RELATED APPLICATIONS

This Application claims priority to U.S. patent application Ser. No. 16/219,060, filed Dec. 13, 2018, which is incorporated herein by reference.

BACKGROUND

Conventional point-of-sale (POS) devices allow merchants to create tabs associated with customers to document goods and/or services acquired by customers during the course of an event, during a certain time period, when the customer is present at the merchant, and the like. Typically, when the merchant desires to close one or more of the customer tabs, the merchant is forced to close each tab separately. This process can be time-consuming and may lead to loss of and/or delayed funds for merchants, particularly in situations where a large group of customers leave the merchant location at approximately the same time.

BRIEF DESCRIPTION OF THE DRAWINGS

Features of the present disclosure, its nature and various advantages, will be more apparent upon consideration of the following detailed description, taken in conjunction with the accompanying drawings.

FIG. 2 illustrates an example environment in which customer tabs may be batch-processed in response to an event, such as the occurrence of a predefined time of day, the end of an concert or other performance, or the like.

In the figures, the left-most digit(s) of a reference number identifies the figure in which the reference number first appears. The use of the same reference numbers in different figures indicates similar or identical items or features. The drawings are not to scale.

DETAILED DESCRIPTION

Figure 1:
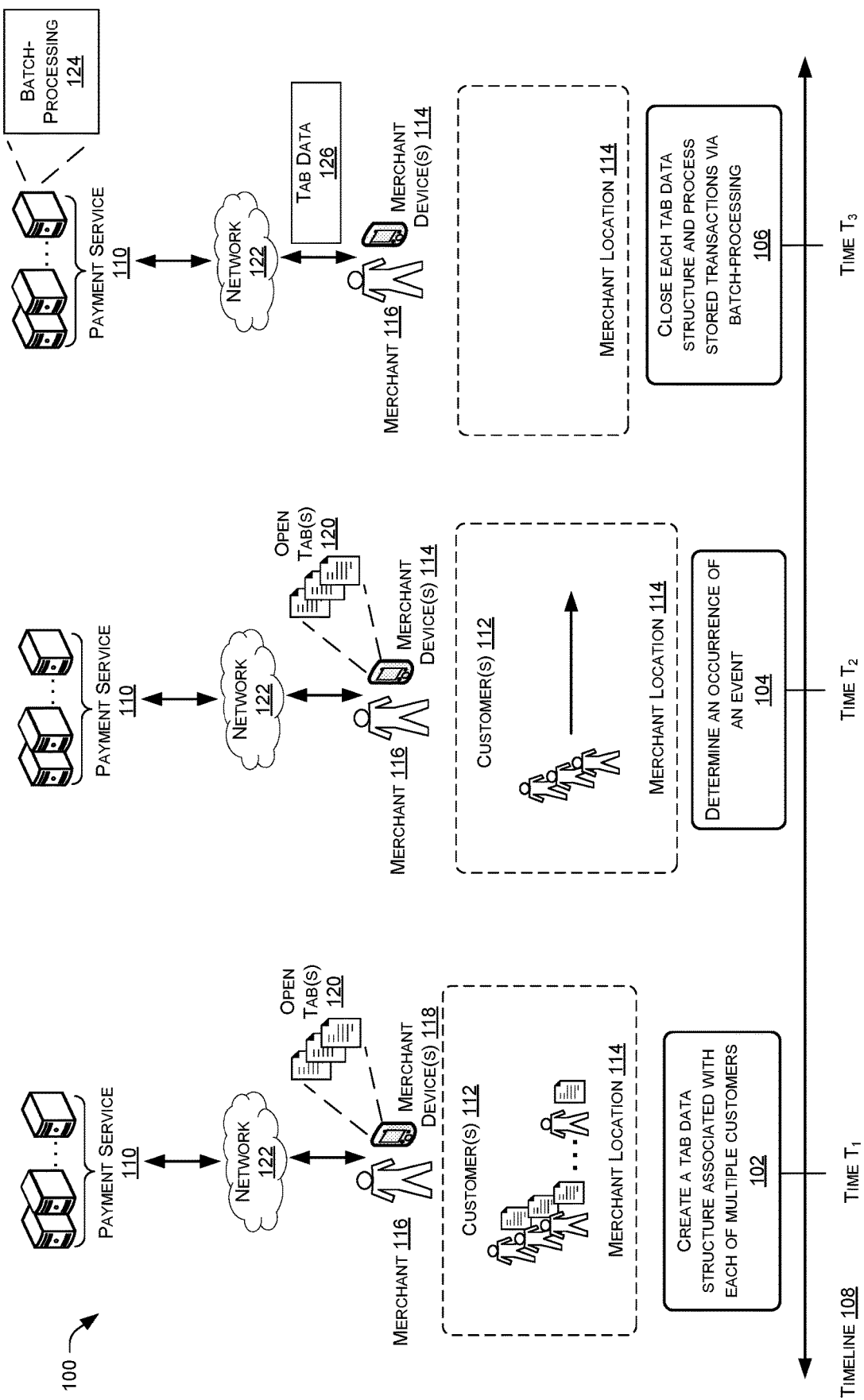
FIG. 1 illustrates an example process for batch-processing customer tabs in response to an event. In this example, a large group of customers exits a merchant location at a certain time, resulting in the batch-processing of each of the tabs as opposed to the processing of each tab individually.

Techniques described herein are directed to, in part, batch-processing of customer tabs in response to an event. This allows a merchant to process all open tabs at, or near, the same time, thereby resulting in an efficient and timely processing of customer payments and acquisition of associated funds. To provide an example, a customer may be associated with a payment instrument and/or an identifier, such an admission ticket or a name, which may be utilized to create a tab associated with the customer. The tab may be a data structure used to record: transactions between the merchant and the customer, such as the customer ordering food, drinks, services, or physical merchandise from the merchant; customer or merchant locations while making such orders after appropriate permissions from the customer or merchant respectively; contextual information of transactions; or the like. In response to an event, such as a particular time of day (e.g., closing time for the merchant) or conclusion of a performance, each open tab associated with the merchant may be closed and processed in a "batch". That is, the financial transactions between the merchant and each respective customer, indicated by the tab, can be completed in a single process, rather than individually. In this way, the merchant may avoid the time-consuming process of processing individual payments associated with individual customers. Additionally, the merchant may receive funds associated with the transactions in a timely manner and may avoid the delay or loss of funds associated with declined payment instruments, delayed processing, or the like.

As is known, conventional payment processing systems are configured to process customer tabs individually and at different times. For example, each customer tab may be processed when the customer leaves a merchant establishment, when an employee (e.g., the customer's server) ends a shift, or the like. However, processing individual customer tabs can be time consuming and may lead to a delay in receiving of funds, loss of funds, inconsistent and/or inefficient reconciliation of funds, or the like. For example, if a merchant is forced to settle each customer tab individually, the process may be lengthy and may lead to tabs being processed on different days (e.g., if the processing is not completed before midnight). As a result, the distribution of funds may be delayed and/or inconsistent. This may lead to accounting issues and other financial issues. The batch-processing techniques described herein, however, help to minimize merchant interactions with POS devices, thereby utilizing less computing resources and helping to improve the speed and accuracy of financial transactions.

Further, the techniques described herein help prevent issues that may arise with customer interactions with the merchant and payment instruments. For example, allowing a merchant to batch process open tabs in response to an event helps eliminate the need for customer interaction to settle a tab. For example, in conventional systems, the customer may be required to initiate a tab closure, locate a staff member to assist in closing the tab, authorize payment, and the like. This is both time-consuming and may lead to delayed and/or loss of funds. For example, if a customer leaves a merchant establishment without indicating they would like their tab closed, the merchant may be forced to delay processing the financial transactions indicated by the tab. Further, if the customer has opened a tab without a valid and/or authorized payment instrument, the merchant may experience a loss of funds if the customer does not provide a valid form of payment to close their tab.

In some examples described below, the system may identify a payment instrument and/or identifier associated with a customer to a generate a customer tab for the customer. For example, the system may identify a payment instrument stored in a user data profile associated with the customer and may use this payment instrument for generating a tab for the customer. In other examples, the customer may have used a payment instrument to make a purchase, such as buying a ticket to a performance or other event. The system may access the stored user data or transaction data to identify this payment instrument to associate with the customer. In addition, the system may determine an identifier to associate with the customer and the payment instrument. For example, the identifier may include a purchased ticket, a reservation ID, a customized QR code, etc. The identifier may be configured for display on an electronic device associated with the customer (e.g., a mobile device, tablet, etc.). In examples, the customer may present the identifier to the merchant in association with a purchase transaction. For example, in lieu of presenting alternative forms of identification, the customer may simply present an event ticket to the merchant to make add a transaction to their tab.

In response to identifying a payment instrument and/or identifier associated with the customer, the system may create a tab, or tab data structure, associated with the customer. The tab may be configured to store transaction data indicating details of a transaction between the merchant and the customer. For example, each time the customer wishes to acquire a good and/or service from the merchant, the details of the acquisition, or transaction, may be stored in the tab data. That is, the customer may continue to acquire goods and/or services throughout a certain time period, throughout the course of an event, etc. and each transaction may be stored. In this way, the customer and merchant may process all the stored transactions at one time, upon the closing of the tab. As a result, less interactions with the POS system and/or less computing resources may be utilized to process each individual transaction.

In examples, the system may determine an event that may cause the open tab(s) to be closed and the stored transaction details to be processed. In some examples, a set of transactions within the open tab(s) may be closed. In this example, a set of predefined rules, described herein, may be used to determine which set of transactions within the open tab(s) should be closed in response to the event. Further, in some examples, the event may include occurrence of a previously specified time of day, a fraudulent activity, a customer relocation, or the like. For instance, the time of day may indicate a closing time of the merchant, a conclusion time of a performance or other event, a preferred time as indicated by the merchant, or the like. In examples, the system may determine that the event has occurred by automatic detection and/or receiving an indication from a merchant device. In response to determining that the event has occurred, the system may close all open tabs associated with a merchant and process all stored financial transactions. For example, upon determining that an event has concluded, the system may close an open tab associated with a customer and process a payment for an amount of the goods acquired by the customer throughout an event. In another example, via location services, the system may determine that the user has left the merchant location. In response, the system may close the customer tab and process the stored transactions.

In some examples, the merchant may stipulate the event and/or features associated with the batch-processing of open tabs. For example, the merchant may manually stipulate a desired time of day during which to batch-process tabs. In further examples, the merchant may stipulate features associated with the batch-processing, such as whether to close all tabs, to close a sub-set of the tabs, and the like. For example, a merchant having both a dining area and a bar service area, where the dining area closes prior to the bar area, may stipulate individual times for both the batch-processing of open dining area tabs and the batch-processing of open bar area tabs. In this way, customers that are located in the bar area may continue to add goods and/or services to an open tab after the dining area has closed.

Further, the batch-processing techniques described herein may be implemented with respect to open tab(s) created in response to a user appointment, reservation, invoice, and the like. For example, a tab data structure may be created in response to a user making an appointment at a merchant location (e.g., an appointment to receive a service). In response to the conclusion of the appointment, the open tab may be closed. In some examples, the open tab(s) may also be re-opened after the tab has been batch processed. For example, the tab may be reopened to apply a tip, apply a discount, adjust pricing, and the like.

In addition, in response to determining that the event has occurred, the system may attempt to authorize the payment instrument associated with the customer before processing the stored transactions. For example, the system may attempt the payment instrument for the stored transaction amounts. Alternatively, or in addition to, the system may attempt to authorize the payment instrument at other times. For example, the system may attempt to authorize the payment instrument before the creation of the tab. In addition, the system may attempt to authorize the payment instrument before the first transaction is made, in response to the first transaction, and/or as each transaction is made. The system may attempt to authorize payment for a predetermined amount (e.g., a pre-authorization amount), for an amount indicated by the merchant, and/or for an amount corresponding to a transaction (e.g., 50% of the transaction amount, 100% of the transaction amount, etc.). In this way, the system may determine if the associated payment instrument is valid and/or is able to provide funds for the stored/future transactions. As such, the system may prevent delayed and/or loss of funds for transactions unable to be processed due to invalid payment methods and/or insufficient funds.

In some examples, the batch-processing techniques described herein may include batch settlement, batch capture, batch authorization, batch notification, and the like. For example, in response to the event, the payment instruments associated with each of the open tabs may be authorized in a batch. In some examples, in response to the batch-processing of the open tabs, notifications associated with the closure of the tabs (e.g., final amounts processed, time of processing, etc.). may be provided to the merchant and/or customer in batch. In this way, notifications, authorizations, and all other processes relating to the batch-processing of open tabs may be performed in batch as well, thereby providing a more efficient use of merchant and/or customer resources.

While the description defines techniques to batch-processing, such as closing of tabs, the description can be extended to opening or re-opening tabs in a batch manner as well.

Additional details pertaining to the above-mentioned techniques are described below with reference to FIGS. 1-7. It is to be appreciated that while these figures describe example environments and devices that may utilize the claimed techniques, the techniques may apply equally to other environments, devices, and the like.

FIG. 1 illustrates an example process 100 for batch-processing tabs in response to an event, as described herein. As illustrated in FIG. 1, the process 100 includes example operations 102, 104, and 106, occurring according to a timeline 108.

For example, at operation 102, occurring at time $T_1$, a computing device of one or more computing devices of the payment service 110 may create a tab data structure associated with each customer of one or more customer(s) 112 located at merchant location 114 of a merchant 116. The merchant 116, for the purpose of this discussion, can be any entity that offers items (e.g., goods, services, etc.) for acquisition (e.g., sale, lease, borrow, give away, etc.). The merchant 116 can be an online merchant (thereby servicing customers via an online presence), a brick-and-mortar merchant (thereby servicing customers via physical locations), or a combination of both. In some examples, merchants can have one or more agents (e.g., employees, independent contractors, etc.) that work for, or on behalf of, the merchants. As described herein, actions attributed to a merchant can be performed by an agent of the merchant via a computing device.

The customer(s) 112, as described herein, can be any entity that interacts with the merchant 116 and/or is capable of interacting with the merchant 116. In at least one example, the customer(s) 112 can interact with one or more merchant device(s) 118. In some examples, merchant device(s) 118 may include devices operated by the merchant and/or, in some instances, the customer. For example, the merchant device(s) 118 may include a POS device comprising any electronic device that includes an instance of a merchant application that executes on the respective device. The merchant application may provide POS functionality to the POS device to enable the merchant 116 to accept transactions of the customer(s) 112 transactions and/or payments from the customer(s) 112. The merchant device(s) 204 may correspond to the fixed merchant location 114, such as a brick and mortar store, or a transient/mobile location, such as a vendor booth for events, a food truck, etc. In addition, merchant devices can be owned by the merchant, but can be operated by customers, agents of the merchant, etc. Each merchant device 114 can present a user interface (UI) to enable tab management (e.g., to allow items to be added to the customer tab). A UI for tab management can be presented via a web browser, or the like, via a display of the merchant device(s) 118. In at least one example, a UI for order management can be presented via an application, such as a mobile application or desktop application, which is provided by the payment service 110, or which can be an otherwise dedicated application. In at least one example, the UI for tab management can present one or more items offered for sale by the merchant, for instance, via an electronic menu.

As described herein, a computing device of the payment service 110 may create a tab data structure associated with each of the customer(s) 112 located at the merchant location 114. The tab data structures, referred to herein as open tab(s) 120, may be configured to store transaction data associated with transactions between the customer(s) 112 and the merchant 116 while the tab data structures remain open. In some examples, the payment service 110 may create the open tab(s) upon receiving an indication that the customer(s) 112 are located within a predetermined distance of the physical location of the merchant (e.g., that customer(s) 112 have entered the merchant location 114).

For example, one or more components of the payment service 110 may be configured to interact with one or more customer devices associated with the customer(s) 112 to determine the location of the customer(s) 112. Alternatively, or additionally, the one or more components of the payment service 110 may be configured to receive an indication from the customer device(s) indicating that the location of the customer(s) 112. From this indication, the payment service 110 may determine that the customer(s) 112 are located at the merchant location 114. In response, the payment service 110 may create an open tab 120 in association with each customer 112 determined to be present at the merchant location 114.

In other examples, the open tab(s) 120 may be created in response to the customer(s) 112 purchasing a ticket to an event at the merchant location 114 and/or to an event where the merchant will be located, in response to the customer(s) 112 making a reservation for the merchant location, or the like. For example, the customer(s) 112 may use a related application, such as an appointment or restaurant application, to create a reservation at the merchant location 114. In response to the creation of the reservation, the open tab(s) 120 may be created in association with the customer(s) 112. In other examples, the customer(s) 112 may invite other patrons to join at the merchant location 114 via the application. In response, one or more tabs associated with the customer 112 creating the reservation and the invited customer(s) 112 may be created. In addition, in some examples, a single tab may be created in association with the customers(s) 106. In this instance, when the tab is closed, the batch-processing of the tab transactions may include attributing each of the transactions with the appropriate customer and his/her associated payment instrument.

In further examples, the open tab(s) 120 may be created in response to the customer(s) 112 attempting to make a transaction at the merchant location 114 and/or via the merchant device(s) 118. For example, in response to the customer(s) 112 attempting to obtain an item, such as a drink or food item, the payment service 110 may create an open tab 120 associated with the customer(s) 112.

In some examples, a payment instrument may be determined and associated with the customer(s) 112 and the open tab(s) 114. For example, the payment service 110 may be configured to analyze customer data, such as transaction data or user-provided data, to identify a payment instrument associated with each customer 112. Once the payment instrument has been identified, the open tab 114 may be created. In addition, the payment service 110 may attempt to authorize the payment instrument. In some examples, the payment service 110 may attempt to authorize the payment instrument prior to creating the open tab 114. In other examples, the payment instrument may be authorized periodically, as each transaction is made, or the like.

In at least one example, the open tab(s) 120, and associated transaction data, can be stored on the merchant device(s) 118 and/or at one or more computing devices of the payment service 110, such as one or more intermediary devices of the payment service 110. For example, the intermediary computing device(s) can comprise local server computing devices (e.g., associated with the merchant 116) and/or remote server computing devices (e.g., associated with the payment service 110). In some examples, the open tab(s) 120 can be stored on the merchant computing device 112 and a duplicate can be stored at the payment service 110. The transaction data stored in the open tab(s) 120 may be transmitted to the payment system 102 via one or more network(s) 122.

At operation 104, occurring at time $T_2$, a computing device of one or more computing devices of the payment service 110 may determine the occurrence of an event. For example, a component of the payment service 110 may be configured to determine that the event has occurred at the merchant location 114. In some examples, the event may include a time of day, the conclusion of an event, a fraudulent activity, or the like.

In some examples, the event may include a time of day at which the merchant 116 historically processes open tab(s)

120. For example, the payment service 110 may be configured to analyze merchant data and/or historical data associated with the merchant 116 to determine that the merchant 116 processes open tab(s) 120 when the merchant location 114 closes for the day, closes after each service (e.g., the merchant 116 may close in between breakfast and lunch services), or the like. In the illustrated example, the event corresponds to occurrence of a time of day that is typically associated with large groups of customers exiting the merchant location, such as the closing time of the merchant, the conclusion of a performance occurring at the merchant location, the conclusion of a sporting event that may be televised at the merchant location, or the like.

In other examples, the payment service 110 may determine that the merchant 116 historically processes tabs at the conclusion of an event, such as a performance the merchant is hosting, a peak transaction time (e.g., lunch or dinner), and/or the ending of a special (e.g., happy hour). For example, as depicted in FIG. 1, a large number of customer(s) 112 may leave the merchant location 114 at, or around the same time (e.g., the event). In some examples, the number of customer(s) 112 attempting to leave the merchant location 114 may exceed a threshold number of customer(s) 112, indicating the conclusion of a merchant event. As such, the payment service 110 may determine that the time when the threshold number of customer(s) 112 exit the merchant location 114 comprises an event, in response to which the payment service 110 may close all open tab(s) 120 of all customer(s) 112. In further examples, the event may include a conclusion time of an event the merchant 116 is participating in, such as a sporting event or musical event.

At operation 106, occurring at time $T_3$, a computing device of one or more computing device of the payment service 110 may close each tab data structure and process the stored transactions via batch-processing. For example, in response to the payment service 110 determining that the event has occurred, the payment service may batch-process all open tab(s) 120 via a batch-processing component 124.

In some examples, based on the detected event, the payment service 110 may obtain, via the network 112, all data stored within the open tab(s) 120, collectively referred to herein as tab data 126. For example, one or more components of the payment service 110 may be configured to access the merchant device(s) 114 to obtain the tab data 126. Alternatively, or additionally, the payment service 110 may have receive the tab data 126 periodically, as the open tab(s) 120 remain open, may store a duplicate copy of the open tab(s) 120, or the like. In response to the open tab(s) 120 being closed and the tab data 126 being accessed/received by the payment service 110, the transactions stored within the tab data 126 may be batch-processed. For example, each transaction of the tab data 126 may be processed via the payment instrument associated with each open tab 114.

Conventionally, the open tab(s) 120 would be settled individually, by the merchant 116 at the merchant device(s) 118. However, settling each open tab 120 individually, can be a time-consuming process, requiring a large volume of resources associated with each individual merchant 116 interaction with the merchant device(s) 114. In addition, when a large number of customers leave the merchant location 114 at or around the same time, it may be difficult for each customer 112 to locate the merchant 116 and/or merchant device(s) 114 to settle an open tab 114. Further, the customer(s) 112 may leave without settling their open tab(s) 114 at all, or may provide a payment instrument with insufficient funds. As a result, inconsistencies may occur when open tab(s) 114 are settled on different calendar days, are left open, or the like, resulting in the delay or loss of funds. The automatic batch-processing techniques described herein help to prevent inconsistent processing of tabs, ensure timely distribution of funds, and reduce computing resources associated with individually processing open tabs at the merchant device.

Figure 2:
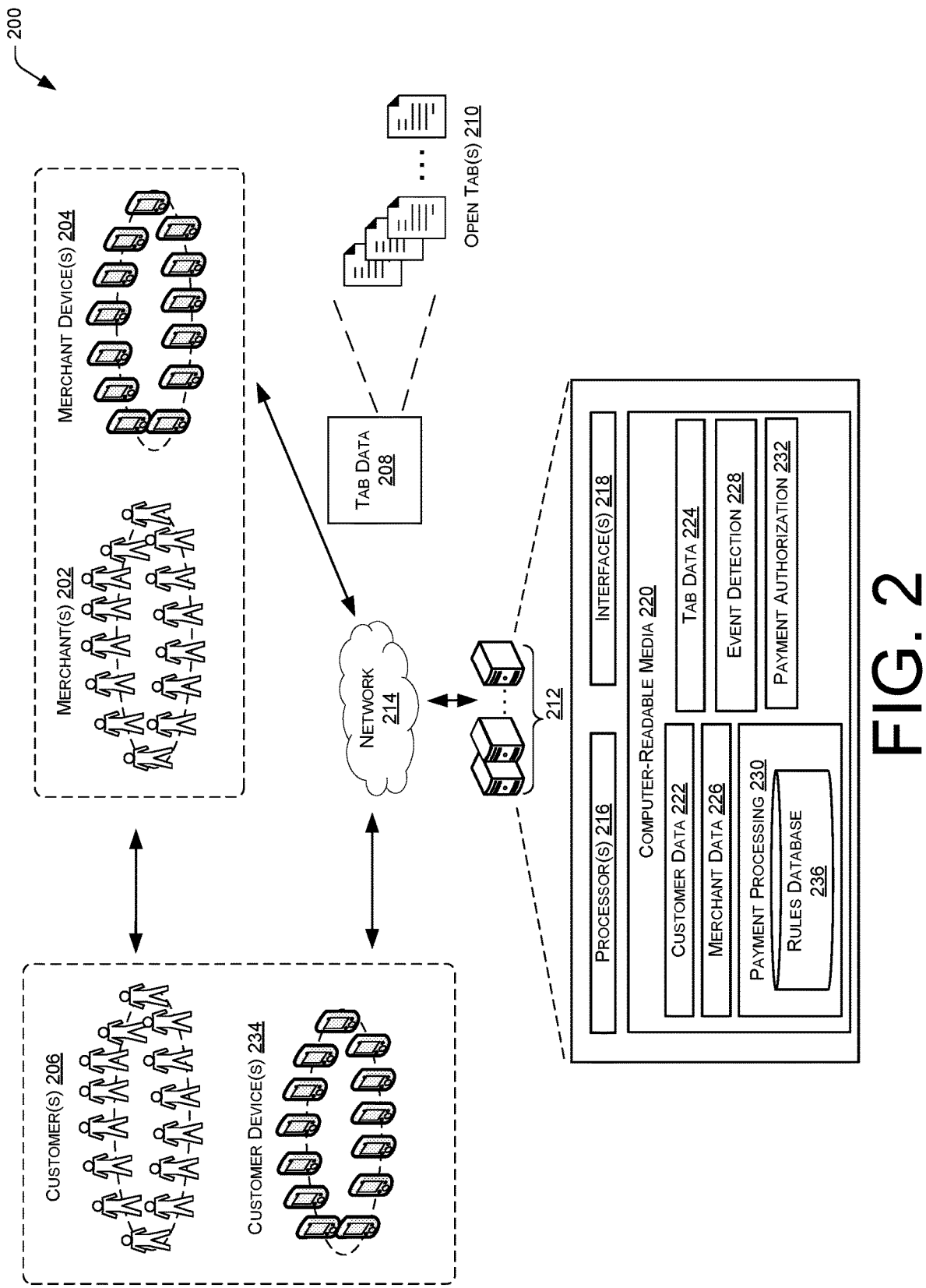

FIG. 2 illustrates an example environment 200 in which customer tabs may be batch-processed in response to an event. As illustrated in FIG. 2, the environment 200 includes various merchant(s) 202 operating respective point-of-sale (POS) device(s) 204 to engage in transactions with customer(s) 206. Transaction data associated with the customer(s) 206 may be stored as tab data 208, comprised of individual open tab(s) 210, and the open tab(s) 210 may be batch processed by the payment service 212 in response to an event. For example, the payment service 212 may be configured to receive the tab data 208 via a network 214. It should be understood that, while FIG. 2 depicts one system, payment service 212, the environment 200 may include any number of systems configured to operate independently and/or in combination and configured to communicate with each other via the network 214. It should also be understood that while the object is described as a "system," the object may be considered a device. The components of the system 202 will be described in detail below.

As used herein, a POS device 204 may comprise any electronic device that includes an instance of a merchant application that executes on the respective device. The merchant application may provide POS functionality to the POS device 204 to enable a merchant 202 (e.g., an owner, employee, etc.) to accept payments from a customer 206. The merchant device(s) 204 may correspond to a fixed merchant location, such as a brick and mortar store, or a transient/mobile location, such as a vendor booth for events, a food truck, etc.

As used herein, the merchant(s) 202 may include any business engaged in the offering of goods and/or services for acquisition by the customer(s) 206. Actions attributed to a merchant 202 may include actions performed by owners, employees, or other agents of the merchant and thus no distinction is made herein unless specifically discussed. In addition, as used herein, the customer(s) 206 may include any entity that acquires goods and/or services from the merchant(s) 202, such as by purchasing, renting, leasing, borrowing, licensing, or the like. Hereinafter, goods and/or services offered by the merchant(s) 202 may be referred to as items. Thus, the merchant(s) 202 and the customer(s) 206 may interact with each other to conduct a transaction in which the customer(s) 206 acquire an item from the merchant(s) 202, and in return, the customer(s) 206 provide payment to the merchant(s) 202.

In addition, a transaction may include a financial transaction for the acquisition of goods and/or services that is conducted between the customer(s) 206 and the merchant(s) 206. During the transaction, the POS device 204 can determine transaction information describing the transaction, such as a payment instrument and/or identifier associated with the customer, the item(s) acquired by the customer, a time, place, and date of the transaction, etc. The one or more open tab(s) 210, or tab data structures, may be created to store this transaction information. The open tab(s) 214 data may be stored and transmitted, collectively as tab data 208, via the network 214, to the payment system 212. The tab data 208 may be sent to the payment service 212 either substantially contemporaneously with the conducting of the transaction (in the case of online transactions) or later when the POS device 204 is in the online mode (in the case offline transactions).

The payment service 212 may include one or more processors 216, one or more network interfaces 218, and computer-readable media 220. The computer-readable media 220 may store one or more functional components that are executable by processor(s) 212 such as a customer data component 222, a tab data component 224, a merchant data component 226, an event detection component 228, a payment processing component 230, and/or a payment authorization component 232. At least some of the components of the memory 216 will be described below.

In examples, the customer data component 222 may be configured to store and/or access data associated with the customer(s) 206 and one or more customer device(s) 234. For example, the customer(s) 206 may provide user data upon initiating a transaction with a merchant 202 and/or a third-party. For example, when a customer 206 initiates a transaction with the merchant 202 or the third-party vendor, such as a third-party ticket sales vendor, the customer 206 may provide information such as basic demographic data (e.g., name, address, age, etc.), a preferred payment instrument, whether the customer has authorized batch-processing, etc. The customer data component 222 may access such information and/or receive such information via the network 214. For example, the customer data component 222 may access a database of the merchant 202 storing user data of past and present customers. Alternatively, or in addition to, the customer data component 222 may also receive the customer information from the merchant 202, such as along with the tab data 208. Still further, the customer data component 223 may access a database of the customer device(s) 234 including customer data. In some examples, the customer data may include data indicating whether the user has authorized batch-processing and/or whether the user would like to be notified of batch-processing. For example, in response to the batch-processing, the customer 206 may wish to receive an indication on their customer device 234. Further, the customer may wish to receive an indication that the batch-processing is about to take place, and the customer 206 may authorize the batch-processing via an interface of the customer device 234. The customer data component 222 may then store the customer data for providing the various other components of the payment system 212.

Further, the computer-readable media 220 may store a tab data component 224. The tab data component 224 may be configured to create the open tab(s) 210 and/or receive, access, and/or store the tab data 208 comprising the one or more open tabs 210. As described above, the open tab(s) 210 may include transaction information relating to a transaction between the customer 206 and the merchant 202 and may be stored within one or more storage devices of the Merchant device(s) 204. The transaction information may include the items acquired, the time, date, location, item price, etc. The transaction information may continue to be stored/recorded in the open tab(s) 210 until an event occurs, thereby triggering the closure of the open tab(s) 210. For example, an open tab 210 may record transactions associated with the customer(s) 206 for the duration of an event, while the customer(s) 206 are present at the merchant location, etc. When an event is determined to have occurred, such as the conclusion of the event, the open tab(s) 210 may be closed. The transaction information stored within the open tab(s) 210, collectively referred to herein as the tab data 208, may be transmitted, via the network, to the tab data component 224 at the time of the transaction or at a later time, such as when the open tab(s) 210 are closed. Alternatively, additionally, the tab data component 224 may be configured to access the tab data 208 from the merchant device(s) 204. The open tab 210 may also be tied to other open tabs, e.g., based on rules described above. Such open tabs may otherwise be disconnected, for example pertaining to different customers, different locations or even merchants, but related for the purposes of batch processing. This enables speeding transactions by clubbing otherwise unrelated tabs.

Additionally, the tab data component 224 may be configured to cause the POS device 204 to create the tab data structures corresponding to the open tab(s) 210. For example, the tab data component 224 may receive an indication, from location services associated with an electronic device of the customer, that the customer 206 is present at the physical location of the merchant 202 and, in response, may transmit an indication to the POS device 204 to cause the POS device 204 to create an open tab 210 associated with the customer 206. In other examples, the tab data component 224 may be configured to automatically provide an indication to the POS device 204 to create the open tab(s) 210 associated with the customer(s) 206 in response to the commencement of an event, the purchase of an admission instrument (e.g., the purchase of a ticket to an event), etc.

In examples, the merchant data component 226 may be configured to store and/or access merchant data associated with the merchant(s) 202. For example, upon initiating use of the payment service 212, the merchant(s) 202 may provide various information, such as items for acquisition, pricing information, hours of operation, incorporation information, etc. In addition, the merchant(s) 202 may provide information regarding the event triggering batch-processing of the open tab(s) 210, For example, the merchant(s) 202 may specify a desired time to batch process the open tab(s) 210 and/or an event to trigger the batch-processing, such as the detection of a fraudulent event. Alternatively, or additionally, the merchant may also indicate a subset of the open tab(s) 210 to be batch-processed in response to a certain event. For example, as described herein, a merchant(s) may provide multiple services that are open during different hours (e.g., a dining area and a bar area). The merchant 202 may indicate a time of day at which to batch-process open tab(s) 210 associated with each service (e.g., a time to close the dining area tabs and a time to close the bar area tabs). In addition, the merchant(s) 202 may indicate a subset of open tab(s) 210 that may be closed based on the time the open tab 210 was open, the goods/services transacted for, the tab amount, the associated customer, and the like. For example, the merchant 202 may indicate which customer(s) 206 have authorized and/or opted to have their associated open tab 210 batch-processed.

In examples, the merchant(s) 202 may store such merchant information locally on the merchant device(s) 204. In this instance, the merchant data component 226 may be configured to access, via the network 214, the merchant information from the merchant device(s) 204.

Further, the event detection component 228 may be configured to determine that an event has occurred. The event may indicate that the open tab(s) 210 should be closed and any recorded financial transactions between the merchant 202 and the customer 206 should be processed. For example, the event may include a time of day, conclusion of an event, a fraudulent activity, the migration of a customer, etc. In some examples, the event detection component 228 may receive an indication that the event has occurred. For example, the event detection component 228 may receive an indication from the POS device 204 that fraudulent activity has occurred with respect to the open tab 210 associated with the customer 206. In other examples, the event detection component 228 may detect that the event has occurred. For example, the event detection component 228 may determine that the time of day has occurred. In further examples, the event detection component 228 may receive an indication, via location services, that the customer 206 has left the physical location of the merchant.

In response to the event detection component 228 determining that the event has occurred, the event detection component 228 may provide an indication to the payment processing component 230 to close the open tab(s) 210 and process the stored financial transactions. For example, the payment processing component 230 may receive the tab data 208 and/or access the tab data 208. The payment processing component 230 may determine the financial transactions between the customer(s) 206 and the merchant(s) 202 and may attempt to process each transaction via a batch-processing procedure. In some examples, the payment processing component 230 may include a rules database 236. The rules data based 236 may include one or more rules determined by the payment service 212. The rules may stipulate which transaction data of the tab data 208 to include in the batch-process. For example, the rules may be determined based on customer data 222, merchant data 226, historical data, and/or one or more machine-learning techniques, as described herein, and may specify which items, user transactions, and the like, that should be batch-processed in response to the occurrence of the event. For example, the merchant data 226 may indicate that a merchant 202 provides multiple services (e.g., a bar area and a musical performance area) that end at difference times. Based on these times, a rule may be created to batch-process transactions associated with each of the merchant services at individual times. In other examples, the customer data 222 may indicate which customers 206 have authorized batch-processing. Thus, a rule may be created indicating that only tab data 208 associated with customer(s) that have pre-authorized batch-processing may be batch-processed in response to the event.

In addition, in response to the event detection component 228 determining that the event has occurred, the event detection component 228 may provide an indication to the payment authorization component 232 to attempt to authorize the payment instrument(s) associated with the customer(s) 206 in order to process the financial transactions stored in the open tab(s) 210. The event detection component 228 may further be configured to authorize the payment instruments at other times, such as before the open tab(s) 210 are created, after an initial financial transaction is attempted, and/or after each financial transaction is detected. The payment authorization component 232 may be configured to authorize the payment instruments for a predetermined amount (e.g., as determined by the payment system 212, a financial institution, and/or the merchant(s) 202) or for the amount of the pending transaction.

As used herein, a processor, such as processor(s) 216, can be a single processing unit or a number of processing units, and can include single or multiple computing units or multiple processing cores. The processor(s) 216 can be implemented as one or more microprocessors, microcomputers, microcontrollers, digital signal processors, central processing units, state machines, logic circuitries, and/or any devices that manipulate signals based on operational instructions. For example, the processor(s) 216 can be one or more hardware processors and/or logic circuits of any suitable type specifically programmed or configured to execute the algorithms and processes described herein. The processor(s) 216 can be configured to fetch and execute computer-readable instructions stored in the computer-readable media 220, which can program the processor(s) 216 to perform the functions described herein.

The computer-readable media 220 may can include volatile and nonvolatile memory and/or removable and non-removable media implemented in any type of technology for storage of information, such as computer-readable instructions, data structures, program modules, or other data. Such computer-readable media 220 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the merchant device(s) 206, the computer-readable media 220 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 220 can be used to store any number of functional components that are executable by the processor(s) 216. In many implementations, these functional components comprise instructions or programs that are executable by the processor(s) 216 and that, when executed, specifically configure the one or more processor(s) 216 to perform the actions attributed above to the service provider and/or payment service.

The network interface(s) 218 may enable communications between the components and/or devices shown in environment 200 and/or with one or more other remote systems, as well as other networked devices. Such network interface(s) 218 may include one or more network interface controllers (NICs) or other types of transceiver devices to send and receive communications over the network 214.

For instance, at least some of the network interface(s) 214 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, at least some of the network interface(s) 214 may include a wide area network (WAN) component to enable communication over a wide area network.

Figure 3:
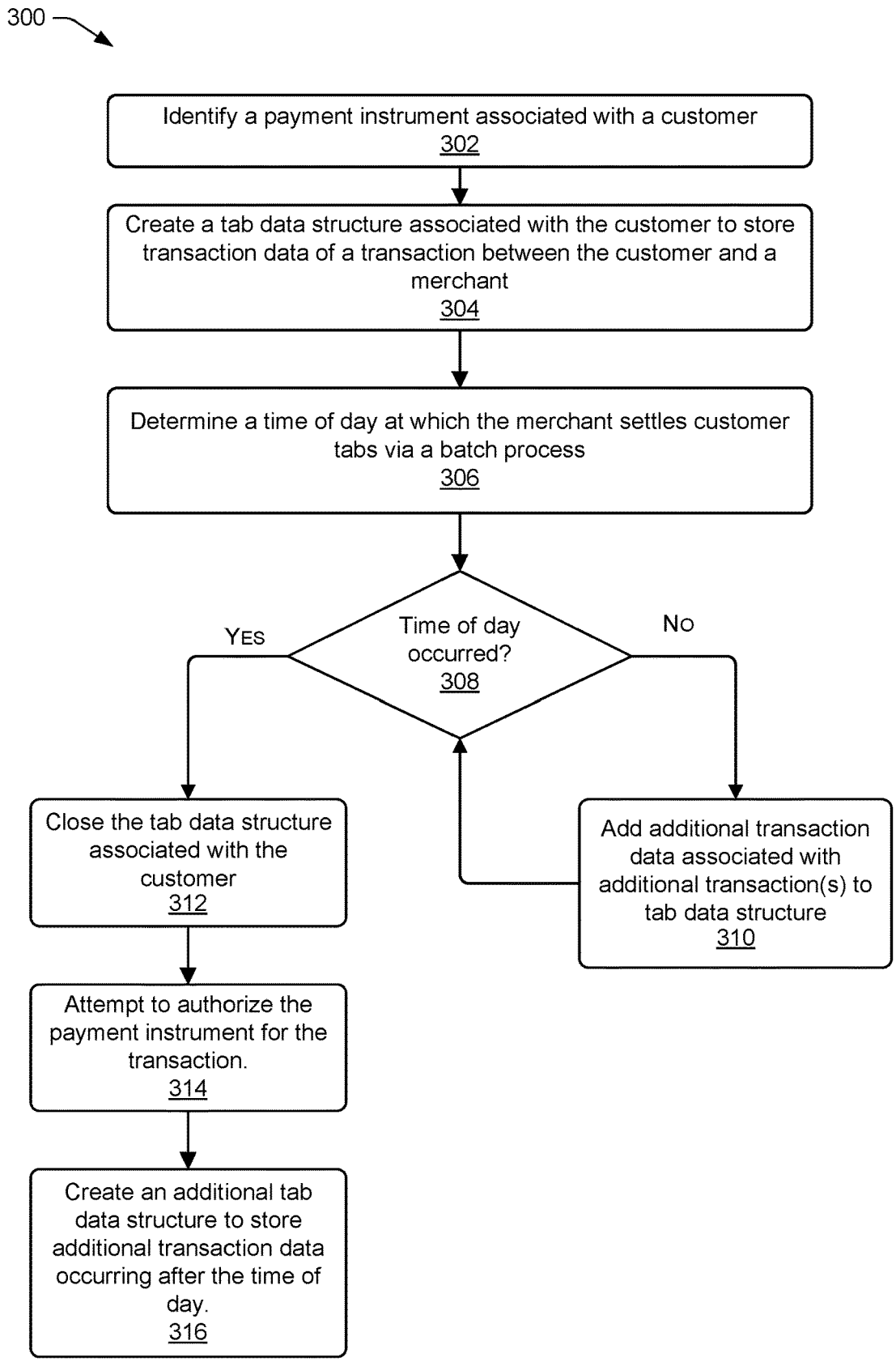
FIGS. 3 and 4 illustrate various flow diagrams of example processes for batch-processing customer tabs in response to an event.
Figure 4:
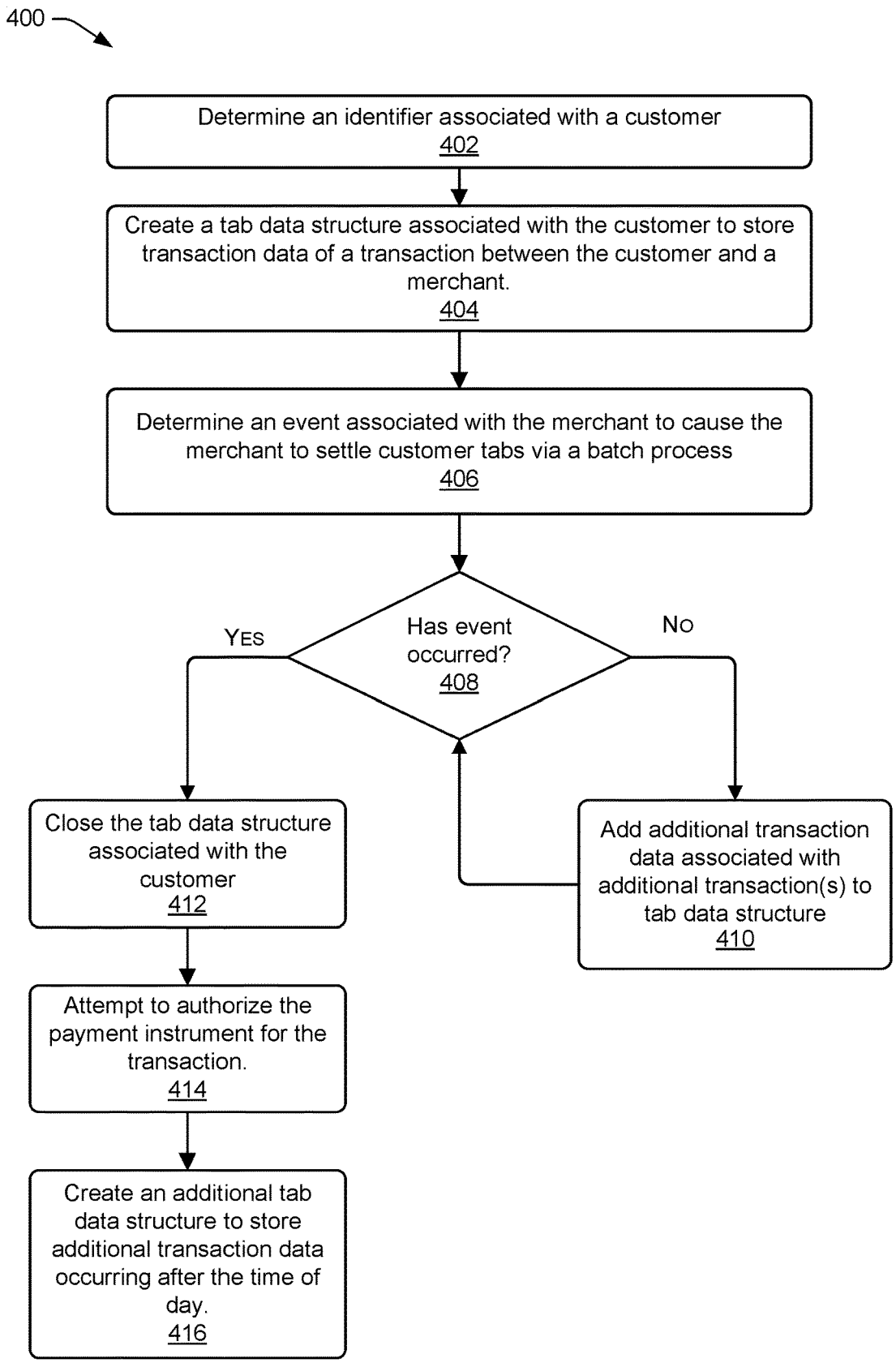

FIGS. 3 and 4 illustrate various flow diagrams of example processes for batch-processing customer tabs in response to an event, as described herein. The processes illustrated in FIGS. 3 and 4 are described with reference to FIGS. 1 and 2, for convenience and ease of understanding. However, the processes illustrated in FIGS. 3 and 4 are not limited to being performed using components described in FIGS. 1 and 2, and such components are not limited to performing the processes illustrated in FIGS. 3 and 4.

The processes 300 and 400 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 300 and 400 can be combined in whole or in part with each other or with other processes.

FIG. 3 illustrates an example process 300 for batch-processing customer tabs in response to an event. In some examples, operations described below can be performed by intermediary computing device(s), such as the payment service described herein. In an alternative example, at least some operations can be performed by a user computing device that is in communication with the intermediary computing device(s) (e.g., in a distributed configuration).

At operation 302, a computing device of one or more computing devices may identify a payment instrument associated with a customer. As described herein, a payment instrument associated with a customer may be determined by a computing device of a payment service. For example, customer data associated with the customer may be provided by the customer and may indicate a preferred payment method. In other examples, a customer data component of the payment service, and/or an alternative computing device, may analyze the customer data and/or a transaction associated with the customer, such as a transaction associated with purchasing an event ticket, a transaction associated with booking a reservation with the merchant, or the like. to determine the payment instrument to associate with the customer.

At operation 304, a computing device of the one or more computing device may create a tab data structure associated with the customer to store transaction data of a transaction between the customer and a merchant. As described herein, a tab data structure associated with the customer may be created by a computing device of the payment service, such as the tab creation component of the payment service. For example, the tab data structure may be configured to store transaction data indicating details of a transaction between the customer and the merchant. For instance, as described herein, the customer may wish to acquire goods and services throughout a time period, the course of an event, throughout a dining experience, etc. In lieu of processing each transaction at the time of acquisition, data associated with the transaction (e.g., the item, price, time, etc.) may be stored within the tab data structure of processing when the tab is closed. In this way, the merchant interactions with a POS device may be limited, thus requiring less resources and increasing the timeliness and accuracy of the payment processing. In some examples, the good and/or service may be acquired by interacting directly with the merchant. In other examples, an identifier associated with the customer may be presented to acquire goods and/or services.

At operation 306, a computing device of the one or more computing device may check against a rule or a preferred condition to be met for settlement of customer tabs. The rules can be set by the merchant, customer, acquirer, payment processor, or determined based on one or more machine-learning models. For example, the computing device may determine a time of day at which the merchant settles customer tabs via a batch process. As described herein, a time of day may be associated with a time when the merchant settles customer tabs via a batch process. For example, the time of day may be determined by analysis of merchant data and/or historical data by the event detection component of the payment service. For example, the time of day may be determined based on one or more machine-learning models executing one or more algorithms (e.g., decision trees, artificial neural networks, association rule learning, or any other machine learning algorithm). In some examples, time of day may include a closing time of the merchant, a conclusion time for an event the merchant, or a time when a majority of a customer base vacates the merchant (e.g., the end of lunch hour, the end of an entertainment performance, etc.), or the like. The determined time of day may indicate a time when the merchant would settle open tabs via a batch process.

At operation 308, a computing device of the one or more computing device may determine whether the condition is met. For example, the computing device determines whether the time of day has occurred. As described herein, for example, the event detection component of the payment service may determine whether the time of day has occurred. For example, based on the determined time of day at which the merchant settles customer tabs, the payment service may determine that the time of day has occurred. In response, the event detection component may provide an indication to the payment processing component that the opened tabs should be closed and the stored transactions should be processed.

If, however, the event detection component determines that the time of day has yet to occur, then at operation 310 additional transaction data associated with additional transactions continues to be added to the open customer tabs. That is, as customers order additional items, information regarding these orders may be recorded on the respective customer tabs, until such point as the predetermined time of day occurs.

At operation 312, based on determining that the time of day has occurred, a computing device of the one or more computing device may close the tab data structure associated with the customer. As described herein, in response to determining the occurrence of the time of day, the payment service may provide an indication to the payment processing component to close the open tab data structures associated with the merchant and/or the customer. In examples, the tab data structure may be reopened in response to a location of the customer, customer behavior, stored preferences, and the like. For example, as described herein, a merchant may provide multiple goods and/or services. For instance, the merchant may provide both a dining area and a bar area. In response to detecting that the customer has migrated from the dining area, utilizing one or more location services as described herein, the open tab associated with the customer may be closed. However, upon detecting that the customer has migrated to the bar area, the tab data structure may be reopened. In this way, the tab data structure may store additional transaction data associated with the customer taking place in the bar area.

At operation 314, a computing device of the one or more computing device may attempt to authorize a payment instrument for the transaction. As described herein, the payment service may attempt to authorize the payment instrument associated with the customer. For example, the payment authorization component of the payment service may attempt to authorize the payment instrument associated with the customer to process the transactions between the merchant and the customer stored within the tab data structure. In some examples, the payment instrument may also be authorized before the tab data structure is opened and/or periodically while the tab data structure is open, such as when each acquisition is attempted. The authorization(s) may be for a predetermined amount or the full amount of the acquisition and/or tab total.

At operation 316, a computing device of the one or more computing devices may create an additional tab data structure (i.e., a child tab data structure of the now-closed, parent tab data structure) associated with the customer to store transaction data occurring after the time of day and including between the customer and a merchant. As described herein, the payment service may create an additional tab data structure associated with the customer after the initial tab data structure has been closed. The additional tab data structure may be configured to store transaction data of transactions between the merchant and the customer after the occurrence of the time of day. For example, in response to determining that the event, such as the time of day, has occurred, the merchant may batch process all open tabs. However, the customer may still be present at the merchant or may wish to continue acquiring goods. In this instance, the merchant may create an additional tab data structure in association with the customer. The computing device may create the tab data structure automatically, and substantially contemporaneously, to the closing of the tab, to ensure that no transactions are lost during the transition between tabs. The new tab data structure may have the same configuration, for example linked customer name, customer payment information, etc., as a previously closed tab or parent tab to allow for a frictionless checkout experience for the customer. New set of rules may apply for batch processing of this newly created tab. In some instances, one or more criteria may be analyzed for determining whether to create an additional data structure for a particular customer. This may include the items that the customer previously ordered, a time of day, an average length of stay by this customer or other customers at the merchant, or the like. For example, if the customer's tab is closed shortly after ordering an entrée from the merchant, then the additional tab data structure may be created in anticipation of the customer ordering a dessert, particularly if the customer has a purchase history associated with ordering deserts. Or, if a sporting event being broadcast at the merchant is still proceeding at the time of closing customer tabs, additional customer tabs may be open in anticipation of some or all of these customers remaining at the merchant. If, however, none of these criteria are met, an additional tab structure(s) might not be created/reopened.

Some of these rules may be created based on the past, current or predicted behavior of the particular customer. In other implementations, the rules are created based on the past, current or predicted behavior of a cluster of customers related to the customer, For example, the cluster of customers may be proximate to the particular customer, the cluster of customers may have visited the same location, or the cluster of customers may be leaving the location at the same time as the particular customer and so on.

Additionally, and/or alternatively, the payment service may determine, based on historical data and/or one or more machine-learning techniques, that a customer frequents a second merchant after leaving the physical location of the merchant (e.g., a nearby bar, a dessert shop, etc.). In response, the payment service, may create an additional tab data structure at the location of the second merchant upon detecting that the customer has left the first merchant location. In this instance, the payment service may provide an indication to the customer to authorize the opening of the additional tab data structure.

FIG. 4 illustrates an example process 400 for batch-processing customer tabs in response to an event. In some examples, operations described below can be performed by intermediary computing device(s), such as the payment service described herein. In an alternative example, at least some operations can be performed by a user computing device that is in communication with the intermediary computing device(s) (e.g., in a distributed configuration).

At operation 402, a computing device of one or more computing devices may determine an identifier associated with a customer. As described herein, an identifier associated with a customer may be determined by a computing device of a payment service. For example, an identifier may include an instrument with which the customer may be identified by, such as an admission instrument (e.g., a ticket to an event), a username, etc. The identifier may be determined by analyzing customer data associated with the customer, such as transaction data, to determine the identifier. For example, transaction data associated with purchasing an event ticket or booking a reservation may be analyzed to determine the identifier, which may include an admission ticket, a reservation confirmation number, etc. The identifier may be presented in association with a transaction to acquire a good and/or service. For example, the customer may present, via a display of a customer device, the identifier to acquire (e.g., add an item to a tab) a good from the merchant. The identifier may further be associated with a payment instrument. For example, the system may determine a payment instrument associated with the transaction data (e.g., the payment instrument used to complete the transaction) and may associate this payment instrument with the customer and/or any tabs opened in association with the customer.

At operation 404, a computing device of the one or more computing device may create a tab data structure associated with the customer to store transaction data of a transaction between the customer and a merchant. As described herein, a tab data structure associated with the customer may be created by a computing device of the payment service, such as the tab creation component of the payment service. For example, the tab data structure may be configured to store transaction data indicating details of a transaction between the customer and the merchant. For instance, as described herein, the customer may wish to acquire goods and services throughout a time period, the course of an event, throughout a dining experience, etc. In lieu of processing each transaction at the time of acquisition, data associated with the transaction (e.g., the item, price, time, etc.) may be stored within the tab data structure of processing when the tab is closed.

At operation 406, a computing device of the one or more computing device may determine an event associated with the merchant to cause the merchant to settle customer tabs via a batch process. As described herein, the event may include a time of day, detection of a fraudulent activity associated with one or more open tabs of the merchant, the conclusion of an event the merchant is participating in, etc. For example, the event may include a time of day when a majority of customers leave the merchant location, such as at the conclusion of a daily special (e.g., happy hour). Based on analysis of merchant data, the payment service may determine that this time of day is associated with the merchant closing open tabs. As a result, this time of day may be determined to be an event causing the merchant to close open tabs via a batch process.

At operation 408, a computing device of the one or more computing device may determine whether the event has occurred. As described herein, a computing device of the payment service, such as the event detection component, may determine whether the event has occurred. For example, the event detection component may determine that a time of day has occurred, that a fraudulent activity has been detected, that the customer has left the physical location of the merchant, and/or that the customer has completed a transaction at another location and/or in an application associated with an electronic device of the customer. For example, the event detection component may receive an indication from a location services component of the customer electronic device. Alternatively, or additionally, the event detection component may be configured to communication and/or access the location services component to determine a location of the device. In response to determining that the customer is located outside of a predetermined location of the merchant, the event detection component may determine that the event has occurred (e.g., that the customer has left the merchant location) and may provide an indication to cause the customer tab to be closed. In further examples, the event may include an elapsed time period. For example, if an amount of time has elapsed during which the customer has not acquired a good and/or service, the event detection component may provide an indication to close the open tab.

In other examples, the event detection component may receive an indication from, or may access one or more applications stored within a memory component of the customer electronic device, to determine that the customer has completed a transaction within another application. For example, the event detection component may receive an indication that the customer has completed a transaction within a rideshare application. In additional examples, the event detection component may receive an indication that the customer has accessed a food delivery application and placed an order for delivery to a location outside of the physical location of the merchant. In further examples, the event detection component may receive an indication that the customer has opened an additional tab at another merchant. In response to these events, the event detection component may provide an indication to cause the open tab associated with the customer to be closed. In still further examples, the event detection component may be configured to periodically access the location services and/or stored applications of the customer electronic device to determine if the event has occurred, such as at a predetermined interval.

If it is determined that the event has yet to occur, then at operation 410 additional transaction data associated with additional transactions continues to be added to the open customer tabs. That is, as customers order additional items, information regarding these orders may be recorded on the respective customer tabs, until such point as the predetermined event occurs.

If, however, the computing device determines that the event has occurred, then the computing device may close the tab data structure associated with each customer, or a subset of customers, as shown at operation 412. As described herein, in response to determining the occurrence of the time of day, the payment service may provide an indication to the payment processing component to close the open tab data structures associated with the merchant, select customers, and/or all of the customers. In response to closing the tab data structure, the stored transactions between the merchant and the customer may be processed. In this example, the payment instrument associated with the customer may be authorized and/or the store transactions may be processed via a batch-processing technique, as shown in operation 414. In examples, the additional tab data structure may be created in response to a location of the customer, customer behavior, stored preferences, and the like. For example, as described herein, a merchant may provide multiple goods and/or services. For instance, the merchant may provide both a dining area and a dessert area. In response to detecting that the customer has migrated from the dining area, utilizing one or more location services as described herein, the open tab associated with the customer may be closed. However, upon detecting that the customer has migrated to the dessert area, the additional tab data structure may be created. In this way, the additional tab data structure may store additional transaction data associated with the customer in the dessert area.

Further, operation 416 represents that the computing device may create an additional tab data structure for storing transaction data associated with transactions that occur after occurrence of the event. Additionally, the payment service may determine, based on historical data and/or one or more machine learning techniques, that a customer frequents a second merchant after leaving the physical location of the merchant (e.g., a nearby bar, a dessert shop, etc). In response, the payment service, may create an additional tab data structure at the location of the second merchant upon detecting that the customer has left the merchant location. In this instance, the payment service may provide an indication to the customer to authorize the opening of the additional tab data structure.

Figure 5:
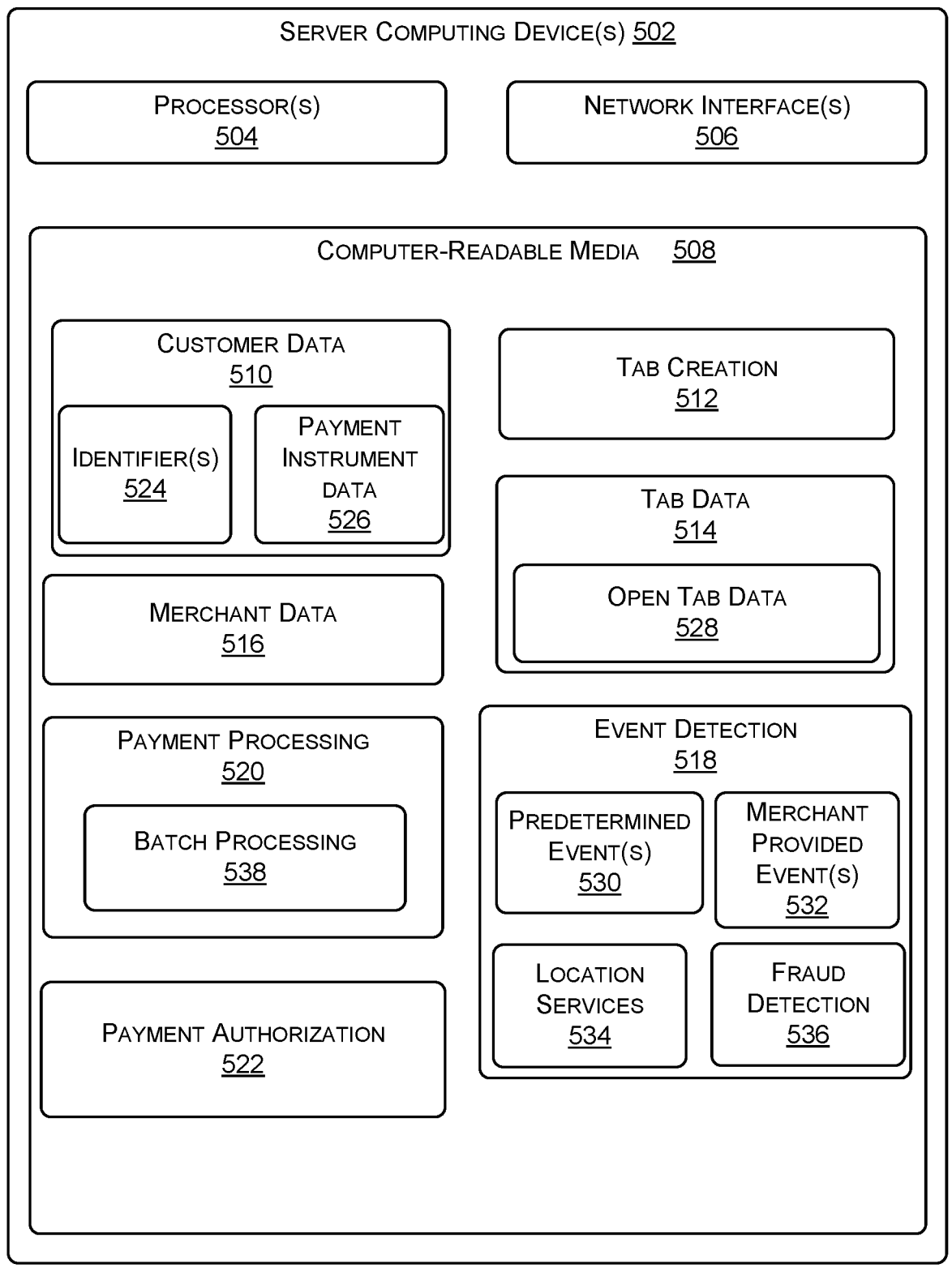
FIG. 5 illustrates an example server computing device that may be used to batch-process customer tabs in response to predefined events.

FIG. 5 illustrates an example server computing device 502 for performing techniques as described herein. As described herein, one or more user computing devices can communicate with one or more intermediary computing devices, such as the payment service described herein. In at least one example, the server computing device 502 can correspond to the one or more intermediary computing devices. As described above, the server computing device 502 can comprise local server computing devices (e.g., associated with a merchant) and/or remote server computing devices (e.g., associated with a payment service).

The server computing device(s) 502 ("server(s)" hereinafter) can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 502 as being present in a single location, these components and data can alternatively be distributed across different computing devices and different locations in any manner. In some examples, such components and data can be distributed across user computing devices, as described herein. The functions can be implemented by one or more server computing devices, with the various functionality described above distributed in various ways across the different computing devices. Multiple server(s) 502 can be located together or separately, and organized, for example, as virtual servers, server banks and/or server farms. The described functionality can be provided by the servers of a single merchant or enterprise, or can be provided by the servers and/or services of multiple different customers or enterprises.

In some examples, the server(s) 502 may perform the same or similar functions as the payment service 212 described in FIG. 2. The server(s) 502 may comprise processor(s) 504 that are operatively connected to network interface(s) 506 and a computer-readable media 508. Each processor 504 can be a single processing unit or a number of processing units, and can include single or multiple computing units or multiple processing cores. The processor(s) 504 can be implemented as one or more microprocessors, microcomputers, microcontrollers, digital signal processors, central processing units, state machines, logic circuitries, and/or any devices that manipulate signals based on operational instructions. For example, the processor(s) 504 can be one or more hardware processors and/or logic circuits of any suitable type specifically programmed or configured to execute the algorithms and processes described herein. The processor(s) 504 can be configured to fetch and execute computer-readable instructions stored in the computer-readable media 1006, which can program the processor(s) 1004 to perform the functions described herein.

The computer-readable media 506 can include volatile and nonvolatile memory and/or removable and non-removable media implemented in any type of technology for storage of information, such as computer-readable instructions, data structures, program modules, or other data. Such computer-readable media 506 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 502, the computer-readable media 506 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 506 can be used to store any number of functional components that are executable by the processor(s) 504. In many implementations, these functional components comprise instructions or programs that are executable by the processor(s) 504 and that, when executed, specifically configure the one or more processors 1004 to perform the actions attributed above to the service provider and/or payment service. Functional components stored in the computer-readable media 506 can include a customer data component 510, a tab creation component 512, tab data component 514, merchant data component 516, an event detection component 518, a payment processing component 520, and/or a payment authorization component 522.

In examples, the computer-readable media 508 may include the customer data component 510, including identifier(s) 524 and payment instrument(s) 526. The customer data component 510 may be configured to receive and/or access data associated with a customer. For example, the customer data component 510 may be configured to access a customer database associated with a merchant or a third-party. For instance, when the customer is initiating a transaction with a merchant, the customer may provide basic customer information, such as age and address, that may be stored in association with a customer profile on the merchant device, or POS device. As another example, the customer may provide information when initiating a purchase with a merchant or third-party vendor, such as a preferred payment instrument, username, etc. The customer data component 510 may be configured to access and/or receive such data from the POS device and/or a third-party vendor.

The customer data component 510 may be further be configured to determine and/or store one or more identifier(s) 524 associated with a customer. For example, the accessed/received customer data may include information associated with a purchase, such as a transaction to purchase an event ticket. In this instance, the customer data component 510 may identify and store the ticket information in association with the customer. In this way, the identifier(s) 524 may be utilized by the customer when initiating a tab transaction. For example, the user may present an indication of the identifier(s) 524, such as an admission ticket to an event configured for display on an electronic device associated with the customer. The merchant may manually and/or electronically utilize the electronic ticket identifier (e.g., electronically scanning the ticket) to associate the transaction with the customer and/or an open tab associated with the customer.

Further, the customer data component 510 may be configured to identify payment instrument data 526 associated with the customer data. For example, the customer data component 510 may be configured to determine, from the information associated with the purchase, a payment instrument to associate with the customer. For instance, in the course of purchasing the event ticket, the customer may be prompted to indicate a preferred payment instrument for the current and/or future transactions. Or, the customer data component 510 may determine, from the payment instrument used to complete the transaction, that the utilized payment method is the preferred payment instrument. The customer data component 510 may then store the payment instrument data 526 in association with the customer and for use in processing financial transactions associated with the customer. For example, the computer data component 510 may store payment instrument data 526 associated with the payment instrument, including a type of payment instrument (e.g., credit card, checking account, etc.), account information (e.g., credit card number, checking account number), etc.

In examples, the memory may further include a tab creation component 512. The tab creation component 512 may be configured to create a tab data structure, or open tab, and/or cause the POS device of the merchant to create the tab data structure. For example, the tab creation component 512 may receive an indication from the customer data component 510 indicating that the customer has purchased an event ticket. In response, the tab creation component 512 may provide an indication to the POS device of the merchant to create a tab data structure, or open a tab, in association with the customer. In additional, the tab creation component 512 may provide the indication in response to an event. For example, in response to receiving an indication that the customer is present at the location of the merchant (e.g., via location services), the tab creation component 512 may provide the indication to the POS device to create the open tab. In further examples, the tab creation component 512 may receive an indication from the POS device that the customer has attempted to initiate a transaction. In response, the tab creation component 512 may provide the indication to open the tab.

Further, the memory may include a tab data component 514. The tab data component 514 may be configured to store open tab data 528 associated with one or more customers, such as customer(s) 112, as described in FIG. 1. For example, the tab data component 514 may be configured to receive and/or access, from the POS device, tab data associated with one or more open tabs associated with the customer(s) 112. For instance, the POS device may transmit data to the tab data component 514 after each financial transaction is initiated. In examples, the POS device may transmit tab data after a predetermined time period has passed, such as every hour. The open tab data 528 may be configured to store details of the transactions such as an associated customer indicator, item information, time of the transaction, etc.

In examples, the computer-readable media 508 may further include a merchant data component 516. The merchant data component 516 may be configured to access and/or receive data associated with various merchants utilizing the server(s) 502. For example, upon initiating use of a payment service of the server(s) 502, merchant(s) may provide various information, such as items for acquisition, pricing information, hours of operation, incorporation information, event participation information (e.g., information regarding events that the merchant will participate in). etc. In addition, the merchant(s) may provide information regarding the event triggering batch-processing of open tabs. For example, the merchant(s) may specify a desired time to batch process the open tabs, such as a closing time of a physical location of the merchant or a conclusion time of an event the merchant will be participating in, and/or an event to trigger the batch-processing, such as the detection of a fraudulent event. Alternatively, or additionally, the merchant(s) may store such merchant information locally on respective POS device(s). In this instance, the merchant data component 516 may be configured to access the merchant information from the POS device(s).

The computer-readable media 508 may further include an event detection component 518. The event detection component 518 may be configured to store predetermined event(s) data 530, merchant provided event(s) data 532, a location services component 534, and/or a fraud detection component 536. For example, the event detection component 518 may be configured to determine and/or detect events that will trigger batch-processing of all open tabs of a merchant. For example, the event detection component 518 may be configured to determine predetermined event(s) data 530 including predetermined event(s) to trigger batch-processing. For example, the event detection component 518 may access, and/or receive from the merchant data component 516, event participation information. From this information, the event detection component 518 may determine a time that an event the merchant is participating in will conclude. The conclusion time of the event may be stored as predetermined event data 530, such that, when the event detection component 518 determines that the conclusion time has occurred, the event detection component 518 may provide an indication to the payment processing component 520 to batch process the open tabs of the merchant.

In another example, the event detection component 518 may access and/or receive merchant data associated with the hours of operation of a merchant. From this information, the event detection component 518 may determine a time, such as the closing time of the merchant, and store the closing time of the merchant as a predetermined event 530 associated with the merchant. Further, the event detection component 518 may include merchant provided event(s). In other examples, the merchant data may indicate a time of day during which customers are likely to leave, such as after lunchtime, when an entertainment performed concludes, etc. As described above, the merchant may provide, via the merchant data, a preferred time to batch process open tabs. Utilizing the predetermined event(s) 530 and/or the merchant provided event(s) 532, the event detection component 518 may determine that an event has occurred and may provide an indication to the payment processing component 520 to batch process the open tabs. For example, utilizing the predetermined event(s) data 530 indicating that the closing time of the merchant is an event, the event detection component 518 may determine that the closing time of the merchant has occurred and may provide an indication to the payment processing component 520 to batch process the open tabs.

In addition, the event detection component may include a location services component 534. The location services component 534 may be configured to determine a location of a customer while an open tab associated with the customer remains open. For example, the location services component 534 may receive an indication from an electronic device associated with the customer indicating the current location of the customer. For instance, the location services component 534 may receive an indication that the electronic device has connected to a server associated with the merchant. In additional examples, the location services component 534 may be configured to periodically interact with a location services component, such as a global positioning system (GPS) or other geolocation component, of the electronic device to determine the current location of the customer. Upon determining that the electronic device is located outside of a predetermined distance of the physical location of the merchant, the location services component 534 may provide an indication to the event detection component 518 that an event has occurred. Alternatively, or additionally, the location services component 534 may be configured to determine when the customer is within the predetermined distance of the physical location of the merchant. Upon detecting the presence of the customer (e.g., the presence of the electronic device), the location services component 534 may provide an indication to the event detection component 518 that an event has occurred. In response, the event detection component 518 may provide an indication to the tab data component 514 to create a tab data structure, or open tab, associated with the customer.

In examples, the event detection component 518 may further include the fraud detection component 536. The fraud detection component 536 may be configured to detect and/or receive an indication that a fraudulent activity has been detected in association with at least one of the open tab(s) of the merchant. For example, the fraud detection component 536 may receive an indication from the POS device of the merchant that a fraudulent transaction has been attempted in association with an open tab. In further examples, the fraud detection component 536 may be configured to monitor the financial transactions associated with open tab(s), by accessing the tab data 528 of the tab data component 514 and/or by receiving the tab data 528 from the tab data component, to detect the presence of a fraudulent activity. Upon detection of a fraudulent activity, the fraud detection component 536 may provide an indication to the event detection component 518 that an event has occurred. In response, the event detection component 518 may provide an indication to the payment processing component 520 to batch process all open tabs of the merchant.

The computer-readable media 508 may further include a payment processing component 520. The payment processing component 520 may include a batch-processing component 538. The payment processing component 520 may be configured to cause the bath processing component 538 to process each open tab associated with a merchant in response to an event. For example, in response to receiving an indication from the event detection component 518 that an event has occurred, the payment processing component 520 may cause the batch-processing component 538 to process all open tabs associated with a merchant. In response, the batch-processing component 538 may be configured to access the open tab data 528 of the tab data component 514 and process all financial transactions stored within the open tab data 528. By batch-processing the open tabs in response to an event, the server(s) 502 may minimize merchant interactions with the POS device, reduce computing resources required to process multiple individual tabs, and prevent the loss and/or delay of funds due to delayed and inconsistent processing.

In examples, the batch-processing component 538 may be configured to communicate with a third-party, such as the financial institution of the payment instrument associated with the open tab, to complete the transactions. For example, in response to receiving an indication to batch process the open tabs, along with receiving the open tab data 528 associated with the open tabs, the batch-processing component 538 may be configured to determine details of each financial transaction stored within the open tab data 528 and attempt to process the various payments with the associated financial institutions.

For example, the payment processing component 520 may be configured to communicate with card payment network server(s) and/or banking server(s) via network(s) to conduct financial transactions electronically. Examples include support scenarios where device(s) that may be included in the card payment network server(s) and/or banking server(s) (not depicted) may include one or more computing devices that operate in a cluster or other configuration to share resources, balance load, increase performance, provide fail-over support or redundancy, or for other purposes. Device(s) that may be included in the card payment network server(s) and/or banking server(s) may include any type of computing device having processing units operably connected to computer-readable media such as via a bus, which in some instances may include one or more of a system bus, a data bus, an address bus, a PCI bus, a Mini-PCI bus, and any variety of local, peripheral, and/or independent buses. In at least one configuration, the computer-readable media of the card payment network server(s) and/or banking server(s) may include module(s) as described above. Alternatively, or in addition, the functionality described herein may be performed, at least in part, by one or more hardware logic components such as accelerators. For example, and without limitation, illustrative types of hardware logic components that may be used include FPGAs, ASICs, ASSPs, SOCs, CPLDs, etc. In at least one example, the card payment network server(s) and/or banking server(s) may each include one or more applications for processing transactions on behalf of the card payment network(s) and/or bank(s), respectively. Furthermore, the card payment network server(s) and/or banking server(s) may each include network interfaces for interfacing with the network(s), as described herein.

In an example, the payment processing component 520 may communicate with an acquiring bank, and/or an issuing bank, and/or a bank maintaining customer accounts for electronic payments. An acquiring bank may be a registered member of a card association (e.g., Visa®, MasterCard®), and may be part of a card payment network. An issuing bank may issue payment cards to customers, and may pay acquiring banks for purchases made by cardholders to which the issuing bank has issued a payment card. Accordingly, in some examples, banking server(s) associated with an acquiring bank may be included in the server(s) 502 and may communicate with the banking server(s) associated with of a card-issuing bank to obtain payment. Further, in some examples, the customer may use a debit card or gift card instead of a credit card, in which case, the banking server(s) associated with a bank or other institution corresponding to the debit card or gift card may receive communications regarding a transaction in which the customer is participating. Additionally, there may be banking server(s) of other financial institutions involved in some types of transactions or in alternative system architectures, and thus, the foregoing are merely several examples for discussion purposes.

In examples, the computer-readable media 508 may include a payment authorization component 522. The payment authorization component 522 may be configured to authorize payment instruments associated with a customer. For example, upon the customer data component 510 identifying a payment instrument associated with the customer, the payment authorization component 522 may be configured to attempt to authorize payment instrument. The payment authorization component 522 may communicate with the financial institution to authorize the payment instrument for a predetermined amount, for an amount indicated by the financial institution, and/or for an amount of a pending financial transaction. The payment authorization component 522 may attempt to authorize the payment instrument at a variety of times. For example, the payment authorization component 522 may attempt to authorize before the creation of the open tab, before each financial transaction between the customer and the merchant, and/or in response to the occurrence of the event and the indication to batch process the payments. For example, in payment authorization component 522 may receive an indication from the event detection component 518 that the event has occurred. In response, the payment authorization component 522 may access and/or receive the payment instrument data 526 associated with the open tab(s) and attempt to authorize the payment instrument(s). In response to receiving an indication that the payment instrument(s) have been authorized, the payment authorization component 522 may provide an authorization indication to the payment processing module 520 to cause batch-processing of the open tab(s).

Figure 6:
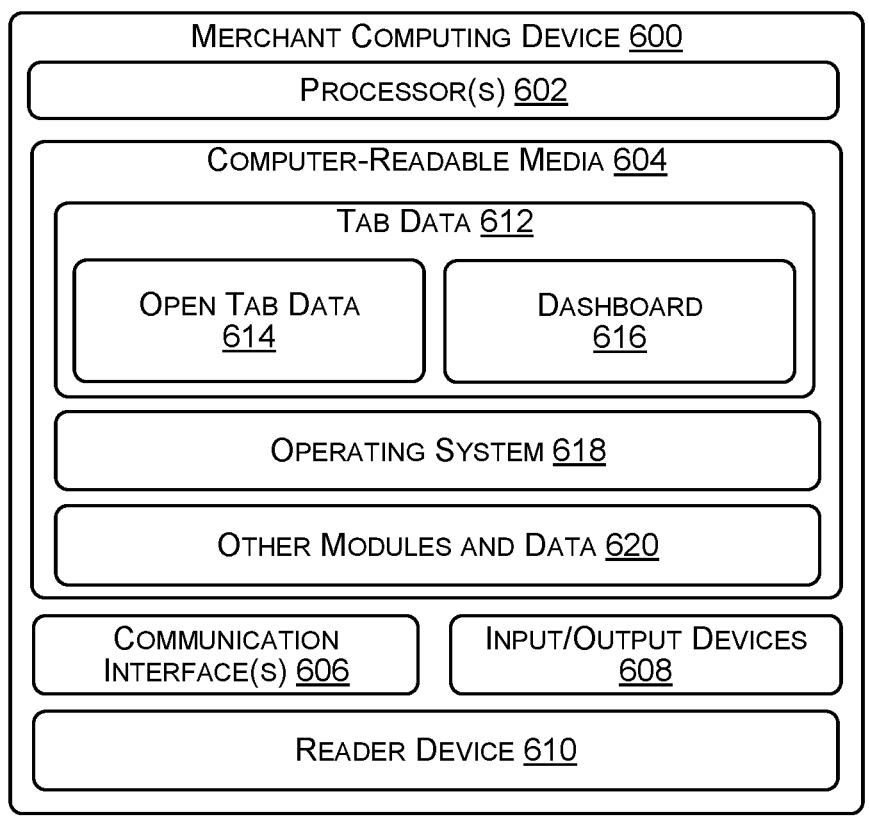
FIG. 6 illustrates an example merchant computing device that may be used to batch-process customer tabs in response to predefined events.

FIG. 6 illustrates an example merchant computing device 600 for performing techniques as described herein. The merchant computing device 600 can be any suitable type of computing device, e.g., portable, semi-portable, semi-stationary, or stationary. Some examples of the merchant computing device 600 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

The merchant computing device 600 is shown as a single device; however, in some examples, the merchant computing device 600 can comprise multiple computing devices that are in communication with one another to perform functions attributed to the merchant computing device 600.

In the illustrated example, the merchant computing device 600 can include one or more processor(s) 602, one or more computer-readable media 604, one or more communication interfaces 606, one or more input/output devices 608, and a reader device 610. Each processor 602 can be a single processing unit or a number of processing units, and can include single or multiple computing units or multiple processing cores. The processor(s) 602 can be implemented as one or more microprocessors, microcomputers, microcontrollers, digital signal processors, central processing units, state machines, logic circuitries, and/or any devices that manipulate signals based on operational instructions. For example, the processor(s) 602 can be one or more hardware processors and/or logic circuits of any suitable type specifically programmed or configured to execute the algorithms and processes described herein. The processor(s) 602 can be configured to fetch and execute computer-readable instructions stored in the computer-readable media 604, which can program the processor(s) 602 to perform the functions described herein.

The computer-readable media 604 can include volatile and nonvolatile memory and/or removable and non-removable media implemented in any type of technology for storage of information, such as computer-readable instructions, data structures, program modules, or other data. Such computer-readable media 604 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the merchant computing device 600, the computer-readable media 604 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 604 can be used to store any number of functional components that are executable by the processor(s) 602. In many implementations, these functional components comprise instructions or programs that are executable by the processor(s) 602 and that, when executed, specifically configure the one or more processor(s) 602 to perform the actions attributed above to the service provider and/or payment service. Functional components stored in the computer-readable media 604 can include a tab data component 612, which can include an order management module 614, and a dashboard 616.

In at least one example, the tab data component 612 can configure the merchant computing device 600 to, collectively with the reader device 610, process one or more transactions and transmit transaction data associated with the one or more transactions to the server(s) 502. That is, tab data component 512 can configure the merchant computing device 600 as a POS terminal to, among other things, process transactions via the payment service (e.g., the server(s) 502). In at least one example, the tab data component 612 can present various user interfaces to enable a merchant to conduct transactions, receive customer requests for goods and/or services, and so forth. In at least one example, the merchant module 612 can send data associated with the good, services, payments (e.g., transaction data), etc. to the server(s) 502. Such transaction data, which can include, but is not limited to encrypted payment data, user authentication data, purchase amount information, point-of-purchase information, etc., can be stored in the open tab data component 528. In at least one example, a data item associated with a transaction can include item(s) acquired via the transaction, a payment instrument associated with the transaction, a cost of the transaction, parties (e.g., customer, merchant) to the transaction, etc.

The tab data component 612 can provide various functionalities to enable merchants to use the payment service. In at least one example, the tab data component 612 can enable merchants to build and manage orders associated with a customer tab via the open tab data component 614. In at least one example, the open tab data component 614 can present UIs for order management via an input/output device 608 of the merchant computing device 600. Additionally, the open tab data component 614 can generate, store, and/or execute instructions for presenting GUIs to enable merchants and/or customers to add items to an open tab.

Further, the dashboard module 616 can enable the merchant to manage transactions, payments, and so forth, via a dashboard. For the purpose of this discussion, a "dashboard" can be a user interface that provides an at-a-glance view of key information (e.g., associated with transactions, payments, etc.).

Additional functional components stored in the computer-readable media 604 can include an operating system 618 for controlling and managing various functions of the merchant computing device 600. In at least one example, the computer-readable media 604 can include or maintain other functional components and data, such as other modules and data 620, which can include programs, drivers, etc., and the data used or generated by the functional components. Further, the merchant computing device 600 can include many other logical, programmatic, and physical components, of which those described above are merely examples that are related to the discussion herein.

The communication interface(s) 606 can include one or more interfaces and hardware components for enabling communication with various other devices, such as over the network(s) described herein. For example, communication interface(s) 606 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The merchant computing device 600 can further be equipped with various input/output (I/O) devices 608. Such I/O devices 608 can include a display, various user interface controls (e.g., buttons, joystick, keyboard, mouse, touch screen, etc.), audio speakers, connection ports and so forth.

In at least one example, the merchant computing device 600 can further a reader device 610 for reading payment instruments. In some examples, the reader device 610 can plug in to a port in the merchant computing device 600, such as a microphone/headphone port, a data port, or other suitable port. The reader device 610 can include a read head for reading a magnetic strip of a payment card, and further can include encryption technology for encrypting the information read from the magnetic strip. Additionally, or alternatively, the reader device 610 can be an EMV payment reader, which in some examples, can be embedded in the merchant computing device 600. Moreover, numerous other types of readers can be employed with the merchant computing device 600 herein, depending on the type and configuration of the merchant computing device 600. In some examples, the reader device 610 can comprise a second device that can be coupled to the merchant computing device 610. In at least one example, such a second device can be associated with its own input/output devices for presenting GUIs to facilitate payment processing.

Figure 7:
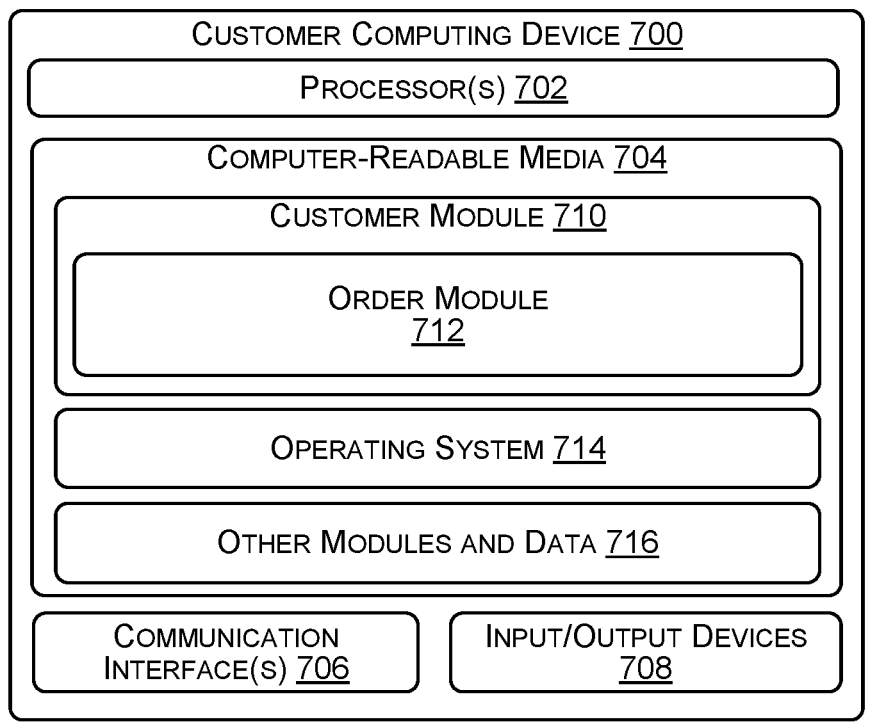
FIG. 7 illustrates an example customer computing device that may be used to batch-process customer tabs in response to predefined events.

FIG. 7 illustrates an example customer computing device 700 for performing techniques as described herein. The customer computing device 700 can be any suitable type of computing device, e.g., portable, semi-portable, semi-stationary, or stationary. Some examples of the customer computing device 700 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. In at least one example, at least some of the user computing device(s) described above with reference to FIGS. 1 and 2, for example, can be the customer computing device 700.

The customer computing device 700 is shown as a single device; however, in some examples, the customer computing device 700 can comprise multiple computing devices that are in communication with one another to perform functions attributed to the customer computing device 700.

In the illustrated example, the customer computing device 700 can include one or more processors 702, one or more computer-readable media 704, one or more communication interfaces 706, and one or more input/output devices 708. Each processor 702 can be a single processing unit or a number of processing units, and can include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For example, the processor(s) 702 can be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 can include volatile and nonvolatile memory and/or removable and non-removable media implemented in any type of technology for storage of information, such as computer-readable instructions, data structures, program modules, or other data. Such computer-readable media 704 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the customer computing device 700, the computer-readable media 704 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 704 can be used to store any number of functional components that are executable by the processors 702. In many implementations, these functional components comprise instructions or programs that are executable by the processors 702 and that, when executed, specifically configure the one or more processors 702 to perform the actions attributed above to the service provider and/or payment service. Functional components stored in the computer-readable media 704 can include a customer module 710, which can include an order module 712.

In at least one example, the customer module 710 can configure the customer computing device 700 to enable a customer to interact with a merchant. The customer application described above can correspond to the customer module 710 described herein. In some examples, the customer module 710 can enable a customer to add item(s) to an open tab via the order module 712. In at least one example, the order module 712 can present UIs for facilitating orders via an input/output device 708 of the customer computing device 700. Additionally, the order module 712 can generate, store, and/or execute instructions for presenting GUIs to enable a customer to add items to an open tab. In some examples, the customer module 710 can present UIs to enable functionality for making reservations, placing delivery orders, scheduling appointments, participating in peer-to-peer payments, or otherwise enabling a customer to interact with merchant(s) that are associated with the payment service.

Additional functional components stored in the computer-readable media 704 can include an operating system 714 for controlling and managing various functions of the customer computing device 700. In at least one example, the computer-readable media 704 can include or maintain other functional components and data, such as other modules and data 716, which can include programs, drivers, etc., and the data used or generated by the functional components. Further, the customer computing device 700 can include many other logical, programmatic, and physical components, of which those described above are merely examples that are related to the discussion herein.

The communication interface(s) 706 can include one or more interfaces and hardware components for enabling communication with various other devices, such as over the network(s) described here. For example, communication interface(s) 706 can enable communication through one or more of the Internet, cable networks, cellular networks, wireless networks (e.g., Wi-Fi) and wired networks, as well as close-range communications such as Bluetooth®, BLE, and the like, as additionally enumerated elsewhere herein.

The customer computing device 700 can further be equipped with various input/output (I/O) devices 708. Such I/O devices 708 can include a display, various user interface controls (e.g., buttons, joystick, keyboard, mouse, touch screen, etc.), audio speakers, connection ports and so forth.

The aforementioned description is directed to devices and applications that are related, in part, to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments. Techniques described herein can be configured to operate in both real-time/online and offline modes. Further, techniques described herein are directed to transactions between customers and merchants, but such techniques can be applicable for any type of entity and should not be limited to use by customers and merchants.

While the aforementioned disclosure makes reference to user interactions via a UI presented via a display of a device, the UI can be presented via any input/output device. As an example, the UI can be output via a speaker, and augmented reality (AR) display, a virtual reality (VR) display, etc. That is, in some examples, the interactive image(s) can be presented via a speaker or an augmented reality and/or virtual reality environment. VR is an immersive experience, which simulates physical presence in a real or imagined environment. For example, a VR environment can immerse a physical, real-world person with computer-generated graphics (e.g., a dog, a castle, etc.) in a computer-generated, virtual scene via a VR display device. AR is a hybrid reality experience, which merges real worlds and virtual worlds. AR is a technology that produces AR environments where a physical, real-world person and/or objects in physical, real-world scenes co-exist with virtual, computer-generated people and/or objects in real time. For example, an AR environment can augment a physical, real-world scene and/or a physical, real-world person with computer-generated graphics (e.g., a dog, a castle, etc.) in the physical, real-world scene viewed via a AR display device.

Further, while the aforementioned disclosure makes reference to the merchant and/or customer interacting with the UI via a selectable control or touch input, in additional or alternative examples, the merchant can indicate a selection via a spoken input or other type of input.

Reference to an "embodiment" in this document does not limit the described elements to a single embodiment; all described elements may be combined in any embodiment in any number of ways. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A computer-implemented method comprising:
   determining, by a server computing device associated with a payment processor, an identifier associated with a user;
   in response to determining the identifier, generating, by the server computing device, a tab data structure specific to the user and a merchant, the tab data structure configured to store transaction data associated with a plurality of transactions associated with the user;
   detecting, by the server computing device, an occurrence of an event;
   in response to detecting the occurrence of the event, determining, by the server computing device and based at least in part on applying a set of rules to the transaction data, to batch-process a portion of the plurality of transactions together with one or more other transactions, wherein the one or more other transactions are stored in another tab data structure that stores other transaction data associated with a plurality of other transactions associated with another user;
   closing, by the server computing device, the tab data structure specific to the user and the merchant; and
   authorizing a payment instrument for the portion of the plurality of transactions between the user and the merchant.

2. The computer-implemented method as claim 1 recites, wherein applying the set of rules to the transaction data comprises applying the set of rules to characteristics of one or more transactions of the plurality of transactions.

3. The computer-implemented method as claim 2 recites, wherein the user comprises a customer of the merchant, and the characteristics include one or more of items requested by the customer while the tab data structure is open, merchant location, type of payment card associated with the customer, amount of a transaction, type of establishment where a transaction was conducted, a time, a date, an item price, or a subsection of a merchant facility.

4. The computer-implemented method as claim 1 recites, wherein a transaction of the plurality of transactions comprises a purchase of one or more items.

5. The computer-implemented method as claim 1 recites, further comprising:
batch-processing, by the server computing device, the portion of the plurality of transactions and the one or more other transactions; and
removing from the tab data structure, by the server computing device, the transaction data associated with the portion of the plurality of transactions.

6. The computer-implemented method as claim 1 recites, wherein the event comprises at least one of a time of day, an end of a performance, or a fraudulent activity.

7. The computer-implemented method as claim 1 recites, wherein a rule of the set of rules comprises a rule to batch-process transactions associated with a first type of item at a first predetermined time and to batch-process transactions associated with a second type of item at a second predetermined time.

8. The computer-implemented method as claim 1 recites, wherein a rule of the set of rules comprises a rule to batch-process transaction including one or more particular items, wherein the portion of the plurality of transactions comprises transactions that include the one or more particular items.

9. The computer-implemented method as claim 1 recites, where the user comprises a customer of the merchant, and wherein a rule of the set of rules comprises a rule to batch-process transactions associated with a first merchant service at a first predetermined time and to batch-process transactions associated with a second merchant service at a second predetermined time.

10. The computer-implemented method as claim 1 recites, wherein at least one rule of the set of rules comprises a rule that batch-processing requires user authorization.

11. The computer-implemented method as claim 1 recites, wherein at least one rule of the set of rules is defined by the payment processor.

12. The computer-implemented method as claim 1 recites, wherein the user comprises a customer of the merchant, and wherein at least one rule of the set of rules is defined by at least one of the merchant, the customer, or an acquirer.

13. The computer-implemented method as claim 1 recites, further comprising:
determining, by the server computing device, at least one of the set of rules using a machine-learning model.

14. The computer-implemented method as claim 13 recites, wherein the user comprises a customer of the merchant, and wherein the method further comprises:
training, by the server computing device, the machine-learning model using at least one of customer data, merchant data, or historical data.

15. The computer-implemented method as claim 1 recites, further comprising:
identifying payment instruments associated with the another user;
creating the another tab data structure that stores the other transaction data associated with the plurality of other transactions associated with the another user; and
in response to detecting the occurrence of the event:
closing the another tab data structure associated with the another user via the batch-process; and
authorizing the payment instruments for the plurality of other transactions associated with the another user.

16. A system comprising:
one or more processors; and
one or more computer-readable media comprising instructions, that when executed by the one or more processors, causes the one or more processors to perform operations comprising:
determining an identifier associated with a user;
in response to determining the identifier, generating a tab data structure specific to the user and a merchant, the tab data structure configured to store transaction data associated with a plurality of transactions associated with the user;
detecting an occurrence of an event;
in response to detecting the occurrence of the event, determining, based at least in part on applying a set of rules to the transaction data, to batch-process a portion of the plurality of transactions together with one or more other transactions, wherein the one or more other transactions are stored in another tab data structure that stores other transaction data associated with a plurality of other transactions associated with another user;
closing the tab data structure specific to the user and the merchant; and
authorizing a payment instrument for the portion of the plurality of transactions between the user and the merchant.

17. The system as claim 16 recites, wherein applying the set of rules to the transaction data comprises applying the set of rules to characteristics of one or more transactions of the plurality of transactions.

18. The system as claim 17 recites, wherein the user comprises a customer of the merchant, and wherein the characteristics include one or more of items requested by the customer while the tab data structure is open, merchant location, type of payment card associated with the customer, amount of a transaction, type of establishment where a transaction was conducted, a time, a date, an item price, or a subsection of a merchant facility.

19. The system as claim 16 recites, wherein the event comprises at least one of a time of day, an end of a performance, or a fraudulent activity.

20. A computer-implemented method comprising:
identifying, at a server computing device associated with a payment processor, a payment instrument associated with a user;
authorizing the payment instrument for a predetermined amount;
in response to receiving an indication that the payment instrument has been authorized, creating a tab data structure specific to the user and a merchant, the tab data structure configured to store transaction data associated with one or more transactions associated with the user;
determining an event, the event to cause settlement of at least a portion of the one or more transactions via a batch process;
detecting an occurrence of the event;
in response to detecting the occurrence of the event, settling at least the portion of the one or more transactions stored in the tab data structure via the batch process;
closing, by the server computing device, the tab data structure specific to the user and the merchant; and
authorizing the payment instrument for the portion of the one or more transactions between the user and the merchant.

* * * * *